(12) United States Patent
Durai et al.

(10) Patent No.: US 11,994,849 B2
(45) Date of Patent: May 28, 2024

(54) MACHINE TO MACHINE COMMUNICATIONS

(71) Applicant: HDS Mercury, Inc., Palo Alto, CA (US)

(72) Inventors: Aravind Durai, Long Grove, IL (US); Steve Roberts, Austin, TX (US)

(73) Assignee: HDS Mercury, Inc., Palo Alto, CA (US)

(*) Notice: Subject to any disclaimer, the term of this patent is extended or adjusted under 35 U.S.C. 154(b) by 728 days.

(21) Appl. No.: 17/187,181

(22) Filed: Feb. 26, 2021

(65) Prior Publication Data
US 2021/0245955 A1    Aug. 12, 2021

Related U.S. Application Data

(63) Continuation-in-part of application No. 16/725,153, filed on Dec. 23, 2019, now Pat. No. 11,167,924.
(Continued)

(51) Int. Cl.
*G05B 19/418* (2006.01)
*B25J 5/00* (2006.01)
(Continued)

(52) U.S. Cl.
CPC ........ *G05B 19/41895* (2013.01); *B25J 5/007* (2013.01); *B65G 1/0421* (2013.01);
(Continued)

(58) Field of Classification Search
CPC ...... B65G 1/06; B65G 1/0421; B65G 1/0492; B65G 65/00; B65G 67/02; B65G 67/22;
(Continued)

(56) References Cited

U.S. PATENT DOCUMENTS 5,819,008 A    10/1998   Asama et al.
6,636,781 B1 * 10/2003   Shen ........................ B25J 9/065
                                                       703/2
(Continued)

FOREIGN PATENT DOCUMENTS

KR        20130099639 A       9/2013

OTHER PUBLICATIONS

Farshad Arvin "A Short-Range Infrared Communication for Swarm Mobile Robots" 2009 International Conference on Signal Processing Systems, May 2009, 454-458.

*Primary Examiner* — Thomas Randazzo
(74) *Attorney, Agent, or Firm* — Cherskov Flaynik & Gurda, LLC

(57) ABSTRACT

A system of exchanging information between machines is described. The system includes multiple communication modules with at least an infrared transmitter and receiver. At least one mobile robot having at least one said communication module. A receiving station communication module includes at least an opposing infrared transmitter and receiver. Each mobile robot identifies itself and communicates its intended tasks to a receiving station by sending a single pulse width encoded message. The encoding of information within the message occurs by the encoded message's timing.

20 Claims, 30 Drawing Sheets

Related U.S. Application Data which is a continuation-in-part of application No. 16/115,347, filed on Aug. 28, 2018, now Pat. No. 10,513,394, which is a continuation of application No. 15/446,958, filed on Mar. 1, 2017, now Pat. No. 10,065,798, which is a continuation-in-part of application No. PCT/US2016/039010, filed on Jun. 23, 2016.

(60) Provisional application No. 62/302,070, filed on Mar. 1, 2016, provisional application No. 62/231,092, filed on Jun. 24, 2015.

(51) Int. Cl.
| | |
|---|---|
| *B65G 1/04* | (2006.01) |
| *B65G 1/06* | (2006.01) |
| *B65G 65/00* | (2006.01) |
| *B65G 67/02* | (2006.01) |
| *B65G 67/22* | (2006.01) |
| *B25J 9/16* | (2006.01) |

(52) U.S. Cl.
CPC ............ *B65G 1/0492* (2013.01); *B65G 1/06* (2013.01); *B65G 65/00* (2013.01); *B65G 67/02* (2013.01); *B65G 67/22* (2013.01); *B25J 9/162* (2013.01); *Y10S 901/01* (2013.01)

(58) Field of Classification Search
CPC ..... B25J 5/007; B25J 9/162; G05B 19/41895; Y10S 901/01; G06Q 10/10; G06Q 10/08
See application file for complete search history.

(56) References Cited

U.S. PATENT DOCUMENTS

| | | | |
|---|---|---|---|
| 10,892,800 B1* | 1/2021 | Katz | ................ H02J 13/00022 |
| 2006/0273749 A1* | 12/2006 | Im | ....................... G05D 1/0242 |
| | | | 318/587 |
| 2018/0364663 A1 | 12/2018 | Millar | |
| 2020/0198122 A1* | 6/2020 | Newman | ............... B25J 9/1676 |

* cited by examiner

| I/O | Step 1 (Docking) | Step 2 (Transition: M→D) | Step 3 (M→D Complete) |
|---|---|---|---|
| MIFX1 | 0 | 0 → 1 → 0 | 0 |
| MIC1 | 1 | 1 → 0 | 0 |
| MIC2 | 1 | 1 | 1 |
| MIR1 | 0 | 1000 ms / 200 | 0 |
| MOS1 | 300 / 900 ms | 300 / 900 ms | 0 |
| MOMO1 | 0 | 1 | 0 |
| MOMI1 | 0 | 0 | 0 |
| MOMO2 | 0 | 0 | 0 |
| MOMI1 | 0 | 0 | 0 |
| RIC1 | 0 | 0 → 1 | 1 |
| RIC2 | 0 | 0 | 0 |
| RIR1 | 0 | 300 / 900 ms | 0 |
| ROR1 | 1000 ms / 200 | 1000 ms / 200 | 0 |
| ROMO1 | 0 | 0 | 0 |
| ROMI1 | 0 | 1 | 0 |
| ROMO2 | 0 | 0 | 0 |
| ROMI2 | 0 | 0 | 0 |
| ROLU1 | 0 | 1 | 0 |
| ROLD1 | 0 | 0 | 1 |
| ROMO3 | 0 | 0 | 0 |
| ROMI3 | 0 | 0 | 0 |
| ROMO4 | 0 | 0 | 0 |
| ROMI4 | 0 | 0 | 0 |
| ROLU2 | 1 | 1 | 0 |
| ROLD2 | 0 | 0 | 1 |

Figure 8B

| I/O | Step 1 (MIF→TP OS→M) | Step 2 (Grid Crack Coming) | Step 3 (M→3 Can Get Go) |
|---|---|---|---|
| MIFX1 | 0 | 0 | 0 → 1 |
| MIC1 | 0 → 1 | 1 | 1 → 0 |
| MIC2 | 1 → 0 | 0 | 1 |
| MIR1 | 0 | ⎡350 ms⎤ 150 | ⎡350 ms⎤ 150 |
| MOS1 | 0 | 50 ⎣450 ms⎦ | 50 ⎣450 ms⎦ |
| MOMO1 | 1 | 0 | 1 |
| MOMI1 | 0 | 0 | 0 |
| MOMO2 | 1 | 0 | 0 |
| MOMI1 | 0 | 0 | 0 |
| RIC1 | 1 → 0 | 0 | 0 → 1 |
| RIC2 | 0 → 1 | 1 | 0 |
| RIR1 | 0 | 50 ⎣450 ms⎦ | 50 ⎣450 ms⎦ |
| ROR1 | 0 | ⎡350 ms⎤ 150 | ⎡350 ms⎤ 150 |
| ROMO1 | 0 | 0 | 0 |

| I/O | | | |
|---|---|---|---|
| MIFX1 | 0 | 0→1→0 | 0 |
| MIC1 | 0 | 0→1 | 1 |
| MIC2 | 0 | 0 | 0 |
| MIR1 | 0 | 250 / 250 | 0 |
| MOS1 | 150 / 350 | 150 / 350 | 0 |
| MOMO1 | 0 | 0 | 0 |
| MOMI1 | 0 | 1 | 0 |
| MOMO2 | 0 | 0 | 0 |
| MOMI1 | 0 | 0 | 0 |
| RIC1 | 1 | 1→0 | 0 |
| RIC3 | 1 | 1 | 0 |
| RIR1 | 0 | 150 / 350 | 0 |
| ROR1 | 250 / 250 | 250 / 250 | 0 |
| ROMO1 | 0 | 1 | 0 |

| I/O | | | |
|---|---|---|---|
| MIFX1 | 0 | 0 | 0→1→0 |
| MIC1 | 1→0 | 0 | 0→1 |
| MIC2 | 0→1 | 1 | 1 |
| MIR1 | 0 | 0 | 250 / 250 |
| MOS1 | 0 | 0 | 150 / 350 |
| MOMO1 | 0 | 0 | 0 |
| MOMI1 | 1 | 0 | 0 |
| MOMO2 | 0 | 0 | 0 |
| MOMI1 | 1 | 0 | 0 |
| RIC1 | 1 | 1→0 | 0 |
| RIC3 | 1→0 | 0 | 0 |
| RIR1 | 0 | 0 | 150 / 350 |
| ROR1 | 0 | 0 | 250 / 250 |
| ROM01 | 0 | 0 | 0 |

| I/O | Step 1 (Docking) | Step 2 (Transfering 1⇒3) | Step 3 (N⇒3 Compact) |
|---|---|---|---|
| MIRX1 | 0 | 0→1→0 | 0 |
| MIC1 | 1 | 1→0 | 0 |
| MIC2 | 0 | 0 | 0 |
| MIR1 | 0 | 150 / 350 ms | 0 |
| MOS1 | 50 / 450 ms | 50 / 450 ms | 0 |
| MOLU1 | 0 | 0 | 0 |
| MOLD1 | 1 | 1 | 1 |
| MOMO3 | 0 | 1 | 0 |
| MOMI3 | 0 | 0 | 0 |
| SIC1 | 0 | 0→1 | 1 |
| SIC2 | 0 | 0 | 0 |
| SIR1 | 0 | 50 / 450 ms | 0 |
| SOR1 | 150 / 350 ms | 150 / 350 ms | 0 |
| SOMO1 | 0 | 0 | 0 |

| I/O | Before (t=0 s) | Instantaneously (t=0 s) | After (t=0.5 s) |
|---|---|---|---|
| MIRX2 | 0 | 0→1→0 | 0 |
| MIC1 | 0 | 1→0 | 0 |
| MIC2 | 0 | 0→1 | 1 |
| MIR2 | 0 | 50 / 450 ms | 0 |
| MOS2 | 150 / 350 ms | 150 / 350 ms | 0 |
| MOLU2 | 0 | 0 | 0 |
| MOLD2 | 1 | 1 | 1 |
| MOM04 | 0 | 0 | 0 |
| MOMI4 | 0 | 1 | 0 |
| SIC1 | 0 | 0 | 0 |
| SIC2 | 1 | 1→0 | 0 |
| SIR2 | 0 | 150 / 350 ms | 0 |
| SOR2 | 50 / 450 ms | 50 / 450 ms | 0 |
| SOM01 | 0 | 0 | 0 |

MACHINE TO MACHINE COMMUNICATIONS

PRIORITY CLAIM

This application claims priority as a continuation-in-part to U.S. application Ser. No. 16/725,153, filed on Dec. 23, 2019, presently pending, which in turn claimed priority as a continuation-in-part to U.S. application Ser. No. 16/115,347 filed on Aug. 28, 2018, which issued as U.S. Pat. No. 10,513,394 on Dec. 24, 2019, and which claimed priority as a continuation of U.S. application Ser. No. 15/446,958 filed on Mar. 1, 2017, which issued as U.S. Pat. No. 10,065,798 on Sep. 4, 2018, which in turn claimed priority to a U.S. Provisional Application Ser. No. 62/302,070, filed on Mar. 1, 2016, presently expired. Application Ser. No. 15/446,958 also claimed priority as a continuation in part of PCT application PCT/US2016/039010, filed on Jun. 23, 2016, presently expired, which in turn claimed priority to U.S. provisional application Ser. No. 62/231,092, filed on Jun. 24, 2015, presently expired, and U.S. provisional application Ser. No. 62/302,070, filed on Mar. 1, 2016, presently expired. The contents of each application are hereby incorporated by reference.

BACKGROUND OF THE INVENTION

1. Field of the Invention

The invention field is a system for enabling low-cost communication between devices in a facility such as a warehouse. The combination comprises a communication module attached to mobile and stationary inventory processing equipment.

2. Background of the Invention

In various embodiments, the invention provides a solution for communicating information between devices used on a premise, such as inside of a warehouse. The embodiment comprises a module attached to mobile devices or stationary equipment that allows the equipment to communicate with other warehouse components.

The invention comprises a communications module, a mobile robot that moves containers from one or more mobile or immobile processing stations in one embodiment. Each processing station includes a complimentary communications module, which can locate, identify, and communicate with the mobile robot. In one embodiment, the processing station includes an engagement mechanism that latches onto the mobile robot once the mobile robot communicates its presence to the processing station.

Under prior art approaches, mobile robots engage simple physical devices to indicate to a processing station that they are present. In this embodiment, no data can be exchanged between the components. Each mobile robot must be equipped with a data encoder and send information using computer communication protocols that create significant overhead in other approaches.

A need exists in the art for a system that facilitates meaningful communication between devices using low power and low-cost solution but does not create traditional networks' overhead.

SUMMARY OF INVENTION

An object of the invention is to create a system for communications between components of a warehouse. A feature of the invention is communications modules are added to various automation components of the warehouse. An advantage of the system is that it allows machines moving inventory in a warehouse to communicate status information while performing their various tasks.

A further object of the invention is to provide a low-cost and low overhead solution for machine-to-machine communications. A feature of the invention is that the communications module uses pulse-length encoded messages sent with minimal overhead. An advantage of the invention is that it allows machines to exchange information without creating the overhead associated with packet-based data exchange protocols.

An additional object of the invention is to provide a communications system that can be retrofitted to various existing equipment. The invention's feature is that it relies on stand-alone communications modules that integrate readily to existing equipment. An advantage of the invention is that the stand-alone modules can be retrofitted to any number of possible inventory management devices in one embodiment.

A further object of the invention is to provide a machine-to-machine communications system that requires little additional power. A feature of the system is that it the communications module does not require constant power to maintain a connection and instead initiates the communications on demand. An advantage of the system is that the communications module will use minimal power while providing communications functionality.

An additional object of the invention is to provide a secure communications system. One embodiment's feature is that it is limited to line of sight communications with known devices using agreed-upon communications channels. An advantage of the invention is that it provides secure communications without the overhead of encrypting all communications.

A system for machine-to-machine communications is described. In one embodiment the system comprises a communication module having at least an infrared transmitter and receiver; a mobile robot having at least one said communication module; and a receiving station communication module having at least an opposing infrared transmitter and receiver; wherein each mobile robot identifies itself and communicates its intended tasks to a receiving station by sending a single pulse width encoded message wherein the encoding of information within the message occurs by timing of the encoded message.

BRIEF DESCRIPTION OF DRAWING

The invention, together with the above and other objects and advantages, will be best understood from the following detailed description of the preferred embodiment of the invention shown in the accompanying drawings, wherein:

FIGS. 8A-8E depict a payload exchange scenario;

DETAILED DESCRIPTION OF THE INVENTION

Figure 1:
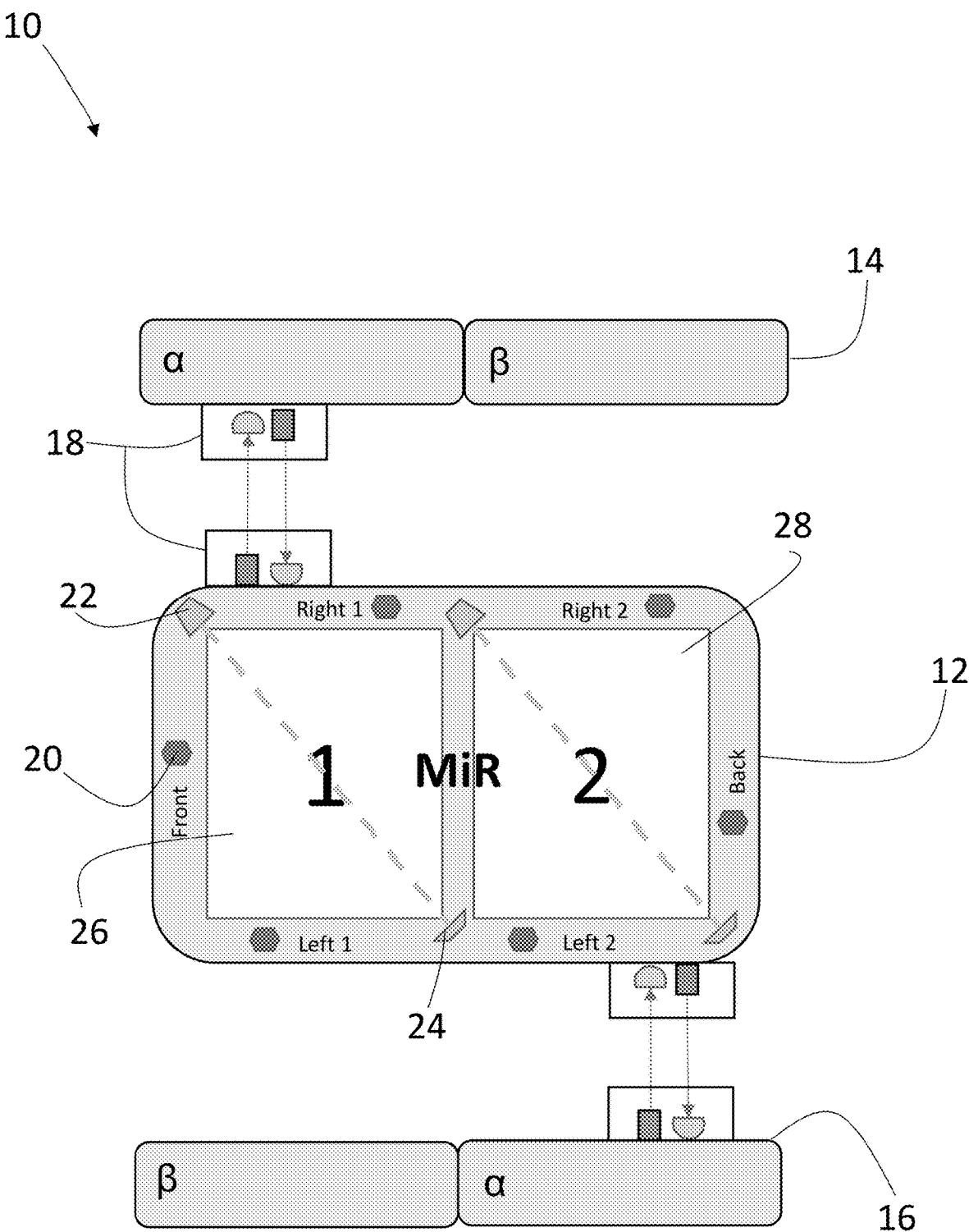
FIG. 1 depicts an overview of the system pursuant to one embodiment of the invention.

The foregoing summary and the following detailed description of certain embodiments of the present invention will be better understood when read in conjunction with the appended drawings.

To the extent that the figures illustrate diagrams of the functional blocks of various embodiments, the functional blocks do not necessarily indicate the division between hardware circuitry. Thus, for example, one or more of the functional blocks (e.g., processors or memories) may be implemented in a single piece of hardware (e.g., a general-purpose signal processor or a block of random-access memory, hard disk, or the like). Similarly, the programs may be stand-alone programs, may be incorporated as subroutines in an operating system, may be functions in an installed software package, and the like. It should be understood that the various embodiments are not limited to the arrangements and instrumentality shown in the drawings.

As used herein, an element or step recited in the singular and proceeded with the word "a" or "an" should be understood as not excluding plural said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising" or "having" an element or a plurality of elements having a particular property may include additional such elements not having that property.

Turning to the figures, depicted in FIG. 1 is a schematic overview 10 of the invented system. As shown in the example of FIG. 1, a mobile robot 12 interacts with a first stack handler station 14 and a secondary stack handler station 16. Each stack handler station is comprised of two loading and unloading locations, designated as a and 13 in the drawings. While in FIG. 1, the locations are shown as mirror images of each other (meaning that α faces β and vice-versa), this is the case only in the depicted embodiment.

Further, while in FIG. 1, each stack handler station is shown as having two locations, in other embodiments, each stack handler station can have multiple stations, designed to interact with multiple mobile robots at the same time, or allowing different goods to be processed in different locations.

Additionally, while in FIG. 1, location a is shown to include the sensors, in other embodiments, each location includes a sensor package, as it is designed to be cost-effective. Likewise, the mobile robot 12 is shown to have one sensor package on each long side, but in other embodiments, the mobile robot will have multiple sensor or communication packages.

It should be appreciated that each stack handler section can be attached to a different stack processing work area, or both can be attached to a single work area, simply allowing the mobile robot to approach the work area from a different side.

Each device, such as the mobile robot 12 or a first stack handler 14 includes a communications module 18, the details of which are described below. While each stack handler is shown as having one communication module 18, and the mobile robot 12 includes two communications modules 18, other combinations are possible.

As shown in the schematic of FIG. 1, the mobile robot 12 is also equipped with diffuse photo eyes 20 and reflective photo eye pairs 22, 24. The pair of reflective photo eyes 22, 24 is designed so that it can detect whether the mobile robot first carrying location 26 and the second carrying location 28 are occupied by a payload, such as a bin, a basket, a box, a stack of items, or another warehouse payload. Each allows the mobile robot to align with the stack handler or other piece of warehouse equipment.

Figure 2:
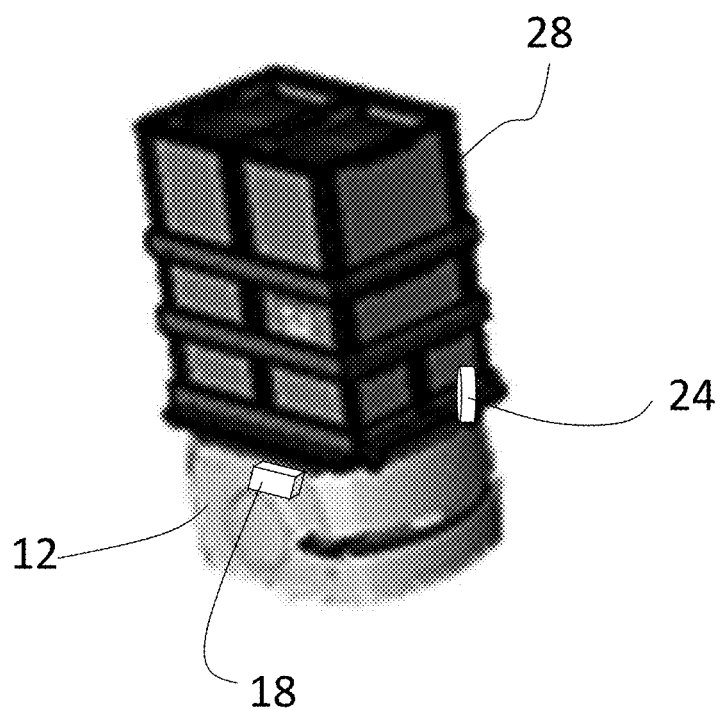
FIG. 2 depicts a 3D view of some of the elements of the schematic overview of FIG. 1.

FIG. 2 depicts a 3D view of the schematic overview of FIG. 1. As can be appreciated from FIG. 2, the mobile robot 12 includes a payload 28, a reflective photo eye 24 designed to confirm the presence of the payload 28, and the communication module 18. The mobile robot interacts with stack handlers (not shown).

Figure 3:
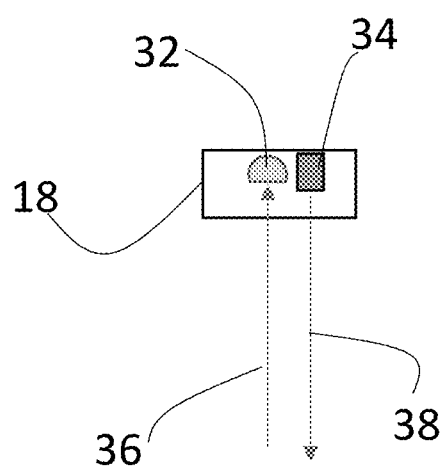
FIG. 3 depicts a schematic overview of one embodiment of a communications module.

A schematic overview of the communications module 18 is shown in FIG. 3. The module includes a through bema transmitter 34 and a through-beam receiver 32. The receiver 32 is adapted to receive a signal, such as the light signal 36 shown in FIG. 3. The transmitter 36 is adapted to send a signal, such as the light signal 38 shown in FIG. 3. In one embodiment, the transmitter 34 is Leuze LS28, while the receiver 32 is the Leuze LE28.

Figure 4:
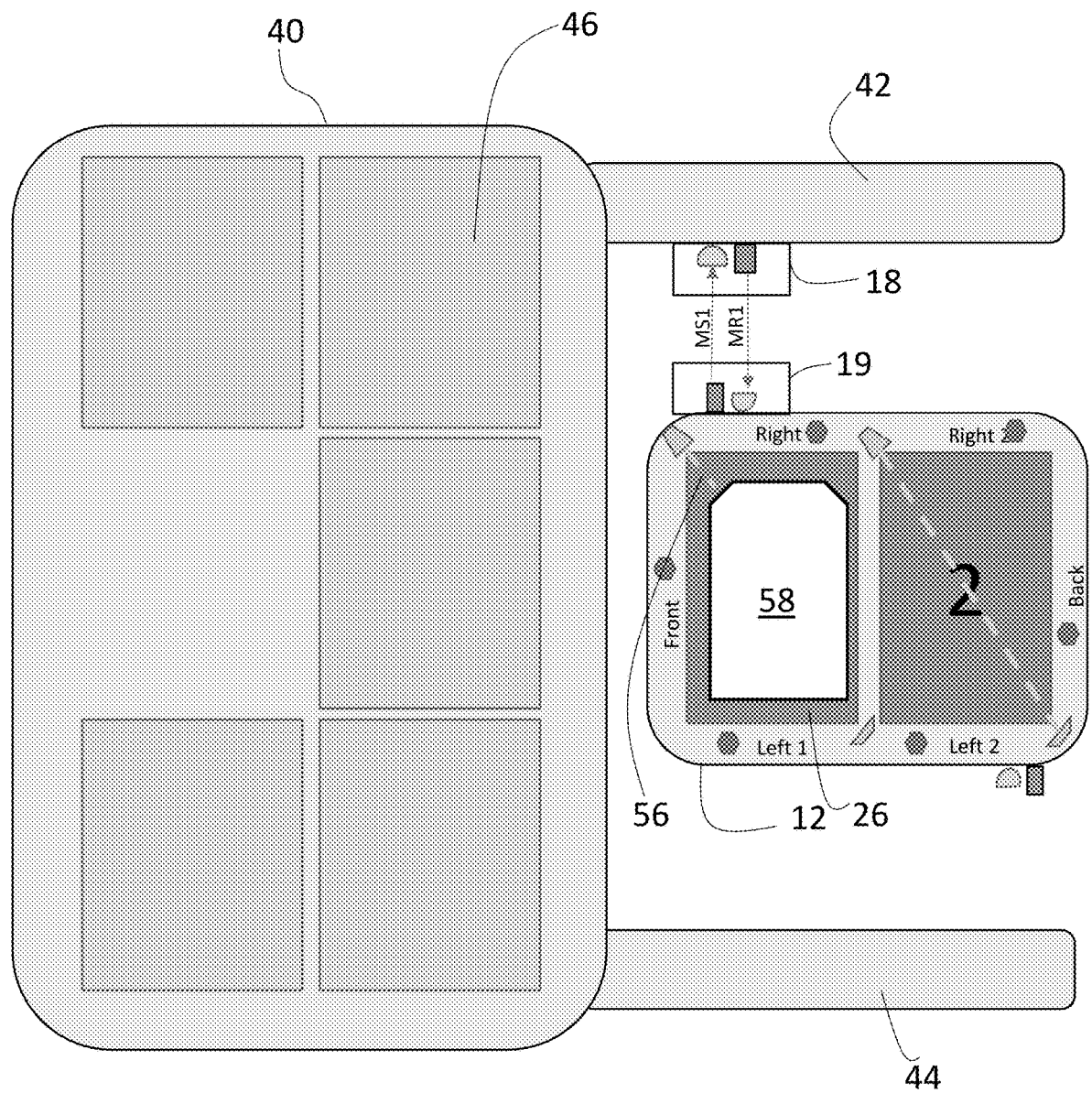
FIG. 4 depicts a schematic arrangement of one component of an embodiment of the system.

FIG. 4 depicts a schematic arrangement of a mobile work area 40, such as a roboframe described in applicant's U.S. patent application Ser. No. 16/115,347, the contents of which are incorporated hereby by reference. The work area 40 includes at least two arms 42, 44, which interface with the mobile robot 12. A first arm 42 also includes a communications module 18, as described above. The work area 40 allows for the transfer of payloads from the mobile robot 12 to the work area 40 designated receiving slot 46.

For example, in FIG. 4, the mobile robot determines that the first carrying location 26 is occupied, such as by determining that the signal 56 between the reflective photo eye pairs is interrupted. The mobile robot identifies that the payload 58 in the first carrying location 26 should be delivered to the work area 40. In one embodiment, the determination occurs by reading an identifier in the payload 58 and verifying the destination in an external lookup table. In another embodiment, the destination of the payload 58 is encoded to the payload identifier directly without the need for external lookups.

The mobile robot 12 aligns at least one of its communication modules 19 with the communication module 18 on the first arm 42. The mobile robot then exchanges messages with the first arm 42 communications module 18 by using a pulse width encoded message sent using infrared signals, as described below:

TABLE 1

Pulse width encoded communications

| Pulse Duration | Machine | Position Signals (RTS—ready to send, RTR—ready to receive) |
|---|---|---|
| 0 | All Machines | No Transfer |
| 100 | Mobile Robot, Stacker | Pos 1 RTS, Pos 2 RTR |
| 200 | Mobile Robot, Stacker | Pos 2 RTS, Pos 1 RTR |
| 300 | Mobile Robot, Stacker | Pos 1 RTS, Pos 2 RTS |
| 400 | RoboFrame | RTS |
| 500 | Mobile Robot, Stacker | Pos 1 RTS, Pos 2 No Xfer |
| 600 | Mobile Robot, Stacker | Pos 2 RTS, Pos 1 No Xfer |
| 700 | Mobile Robot, Stacker | Pos 1 RTR, Pos 2 RTR |
| 800 | Mobile Robot, Stacker | Pos 1 RTR, Pos 2 No Xfer |
| 900 | Mobile Robot, Stacker | Pos 2 RTR, Pos 1 No Xfer |
| 1000 | RoboFrame | RTR |
| 1100 | All Machines | All Transfers Complete |

The above message durations are only exemplary; however, a benefit of this system is that it allows for message exchange between the work area 40 and the mobile robot 12 without exchanging packets of data and without the overhead of data encoding.

In the above table, all messages are transmitted during a 1200 ms time window. As will be discussed in the examples below, in some embodiments, a signal is repeated every 1200 ms until the expected response is received.

Exemplary Transfer

FIGS. 5A to 5F demonstrate the details of the transfer of items from one or more positions on the mobile robot, using the signals described in Table 1 above.

Figure 5A:
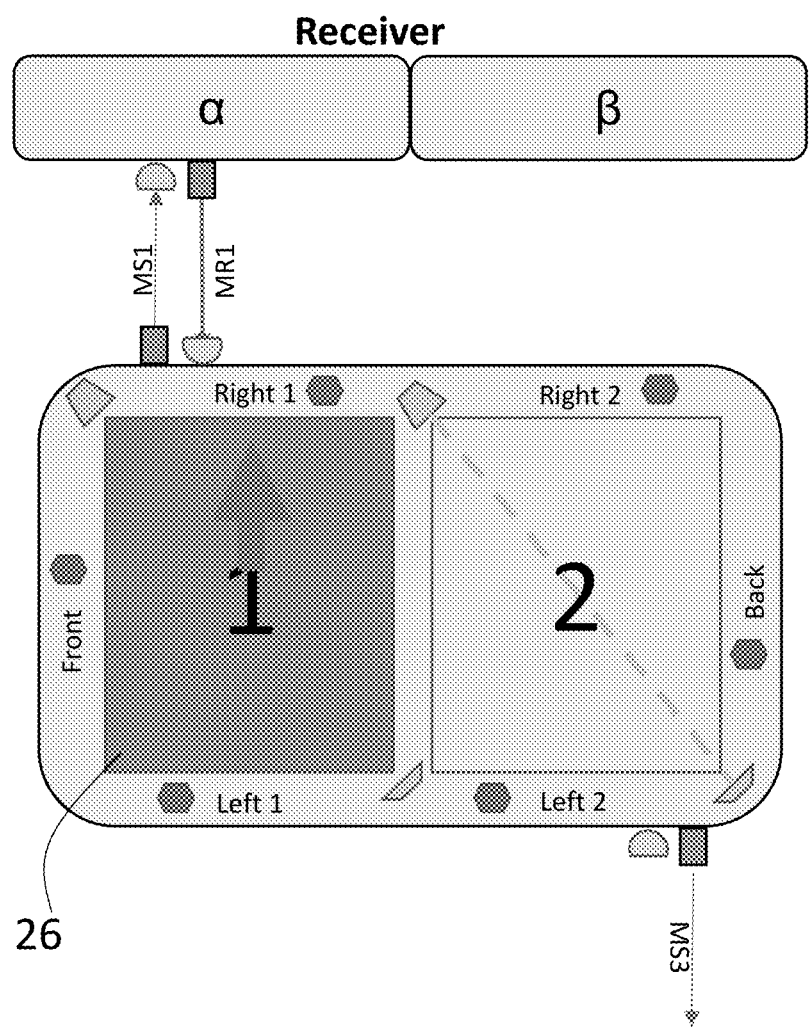
FIGS. 5A to 5F depict an overview of transfer of payloads per one embodiment of the system.

As shown in FIG. 5A, if the first position 26 is occupied and the second position is empty, the mobile robot turns left and right. MS1 and MS3 signals are on for 100 ms and then off for 1100 ms, for every 1200 ms. As both MS1 and MS3 are on, the robot can approach from either side. For example, in FIG. 5A, the MS1 or right side is aligned. In FIG. 5D, the MS3 or left side is aligned.

As the mobile robot does not send or receive packets of information, it does not need to establish a connection to the receiver, such as pairing with the receiver's Bluetooth connection or even being aware of which receiver it is interacting. The communication module can exclude all components other than a basic real-time clock and a controller for the infrared receiver/transmitter, and a battery pack in the depicted embodiment.

The receiving station can identify that a mobile robot has approached its receiver due to the unique pattern of signals sent and received by the mobile robot. By sending the correct pattern of signals, the internal model of the receiving station has a high confidence that it is interacting with a mobile robot.

In some embodiments, a unique identifier is also transmitted by the mobile robot communication module, when requested. The receiving station can identify each mobile robot in those embodiments where such identification is necessary. In most embodiments, the additional overhead of identifying the particular mobile robot is unnecessary. The receiving station needs only to be able to identify the type of entity it is interacting with (i.e., a mobile robot) and not the exact mobile robot it is interacting with. In some embodiments, inventory tracking and management are the responsibility of other components of the warehouse system.

By requiring a particular pattern of signals, as described below, the system provides for inherent security. Unauthorized devices will not be able to transmit the correct pulse-width signals in the correct order. In some embodiments, the meaning of the messages changes regularly, ensuring that only authorized units have the correct message timings.

Returning to the figures, if the RTR signal is received on the right side (MR1 on for 200, 700, or 800 ms), then turn on motors to move stack out of the first position 26.

If the positions α and β are empty on the receiving side, then the receiver will turn on signal MR1 on for 700 ms, then off for 500 ms. If only position α is available, then it turns on RTR 800 ms.

When the RTS signal is received (MS1 on for 100, 300, or 500 ms), the receiver will turn on the motor to receive the container in position α.

Figure 5B:
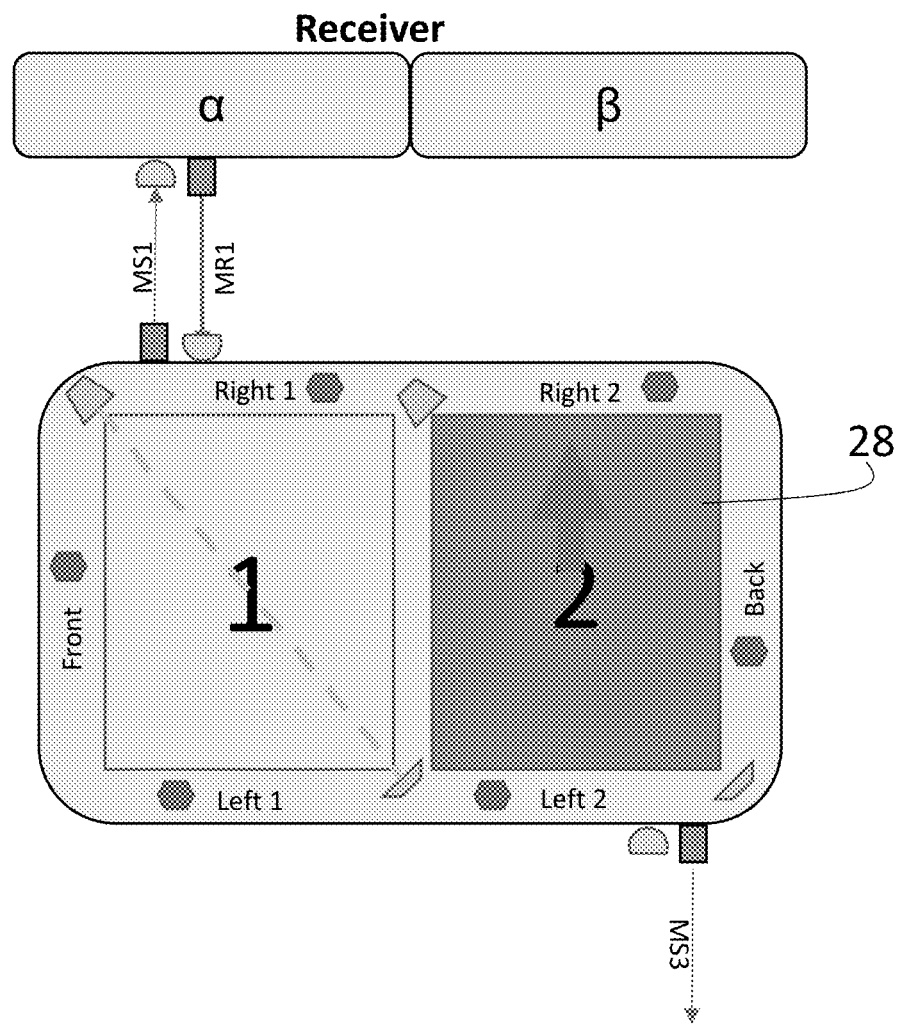

In FIG. 5B, the second position 28, on the mobile robot, contains a transfer payload.

The mobile robot turns left and right. Again, MS1 and MS3 signals are on for 200 ms, then off for 1000 ms every 1200 ms.

If the RTR signal is received on the right side (MR1 on for 100, 700, or 900 ms), then turn on motors to move the stack from the second position 28.

If on the receiving side, the positions α and β are empty, then turn on signal MR1 on for 700 ms, then Off for 500 ms. If only position β is available, then turn on RTR 900 ms. If position 13 is ready to receive and position α is ready to send, then turn On MS1 for 100 ms.

When the ready-to-send signal is received (MS1 on for 200, 300, or 600), then the system will turn on the motor to receive the container on position β.

Figure 5C:
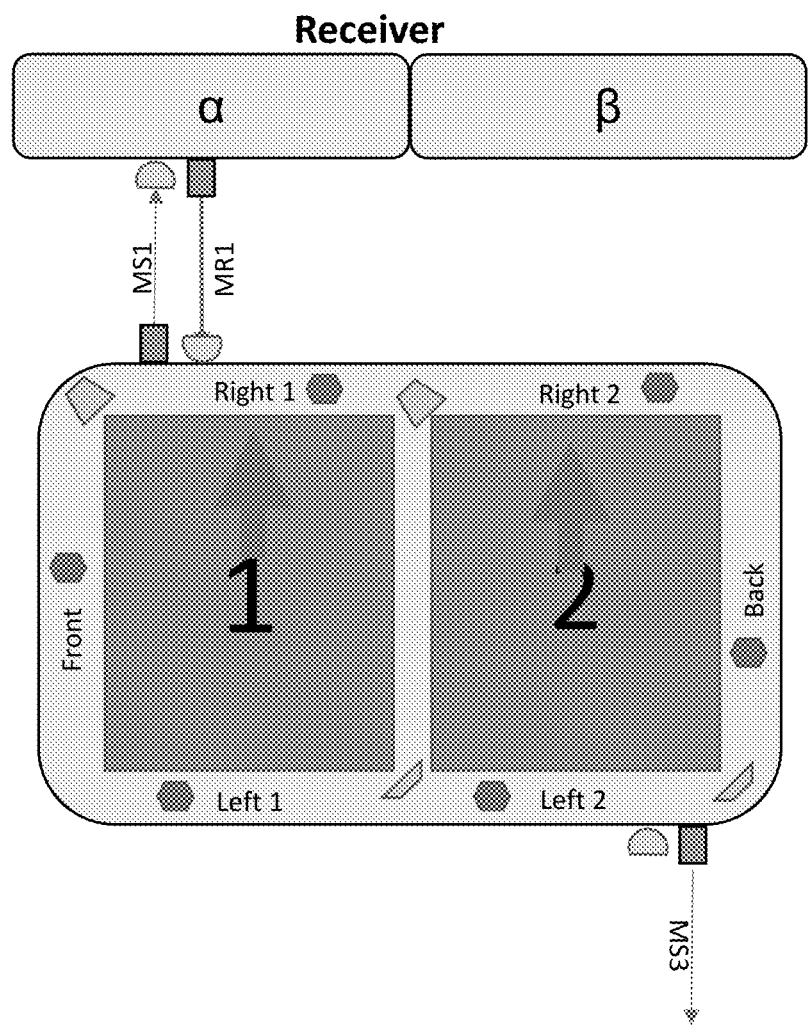
Figure 5D:
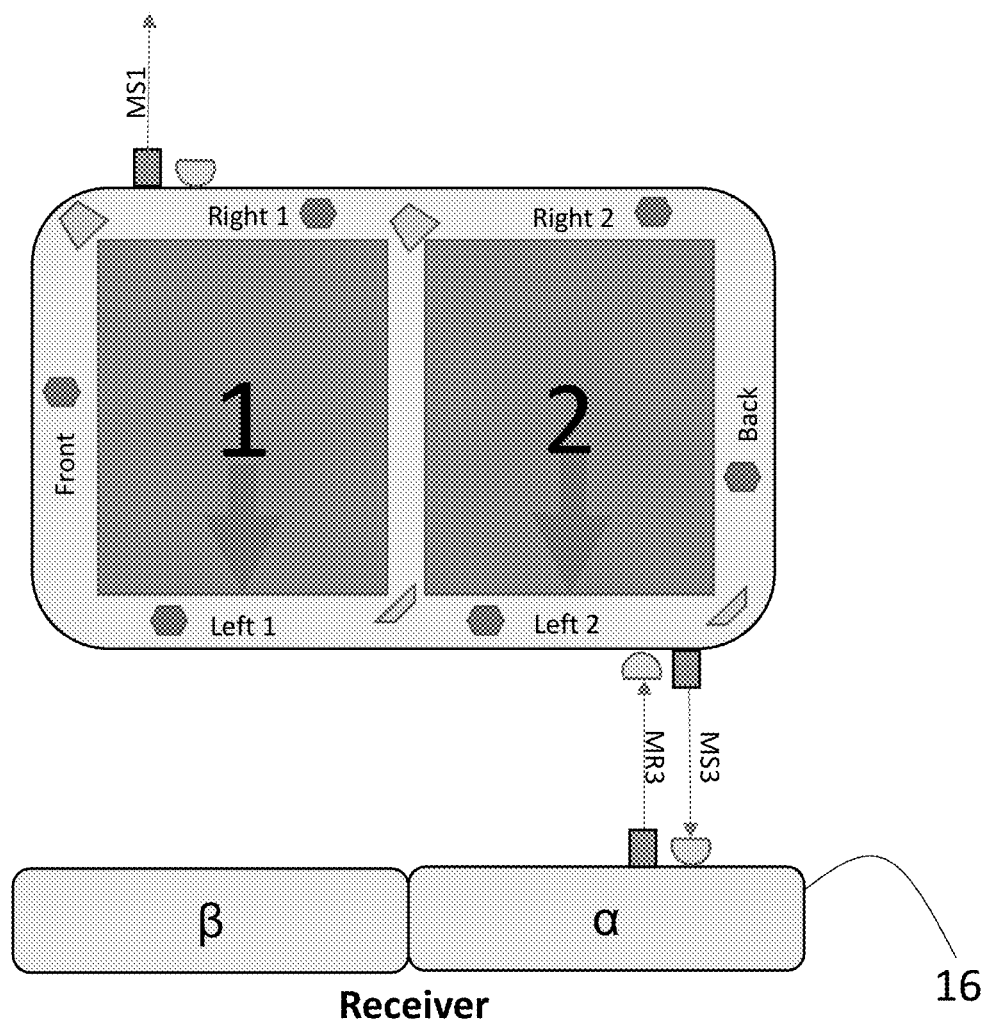

Turning to FIG. 5C, depicted therein is the transfer of stack from the mobile robot to both stack handler positions. In the mobile robot, as both positions 1 and 2 are occupied, then turn left and right. MS1 and MS3 signals are ON for 300 ms, then OFF for 900 ms every 1200 ms.

If ready to receive signal is received on the right side (MR1 on for 200, 700, or 800 ms), then turn on motors to move stack out on right position 1. Otherwise (MR1 on for 100, 700, or 900 ms), turn on the motor to move stack out on right pos 2.

On the receiving stack handler, if stack handler positions are empty, then turn on signal MR1 On 700 ms, then off 500 ms. If only position β is available, then Turn on 'RTR' for 900 ms. If position β is ready to receive and position α is ready to send, then turn on MS1 100. When the RTS signal is received (MS1 On 100, 300 or 500), then turn on the motor to receive the container at position α. When the RTS signal is received (MS1 On 200, 300, or 600), then turn on the motor to receive the container on position 13.

Figure 5E:
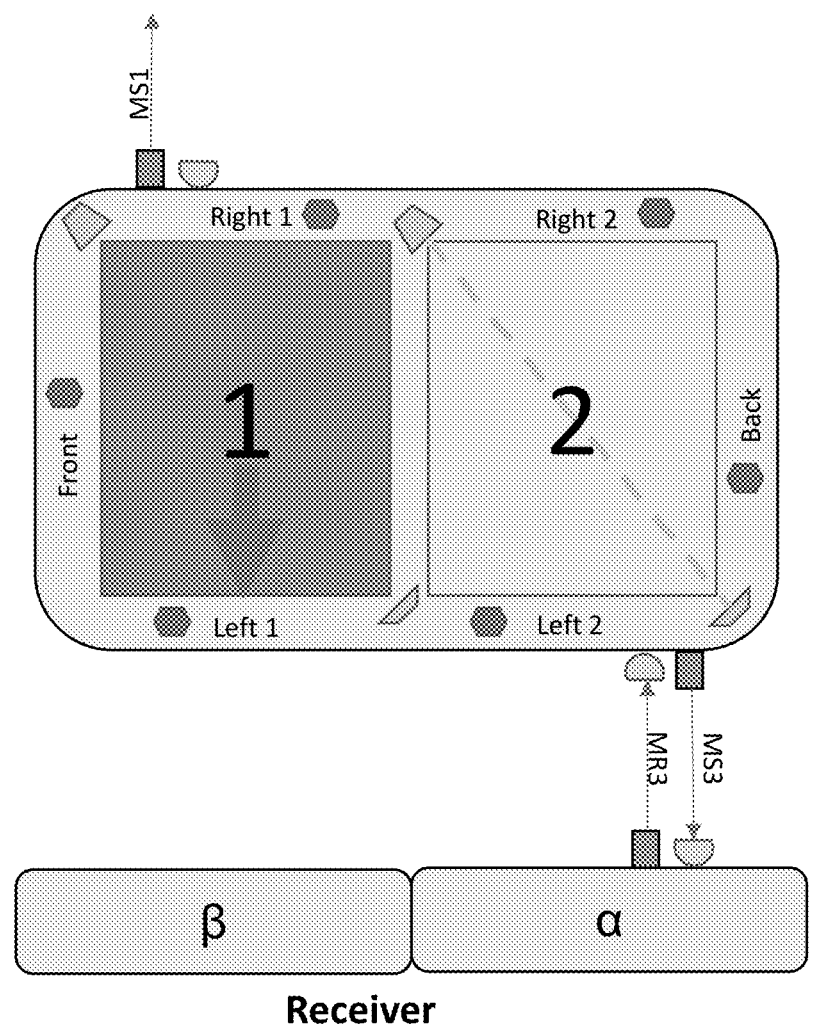
Figure 5F:
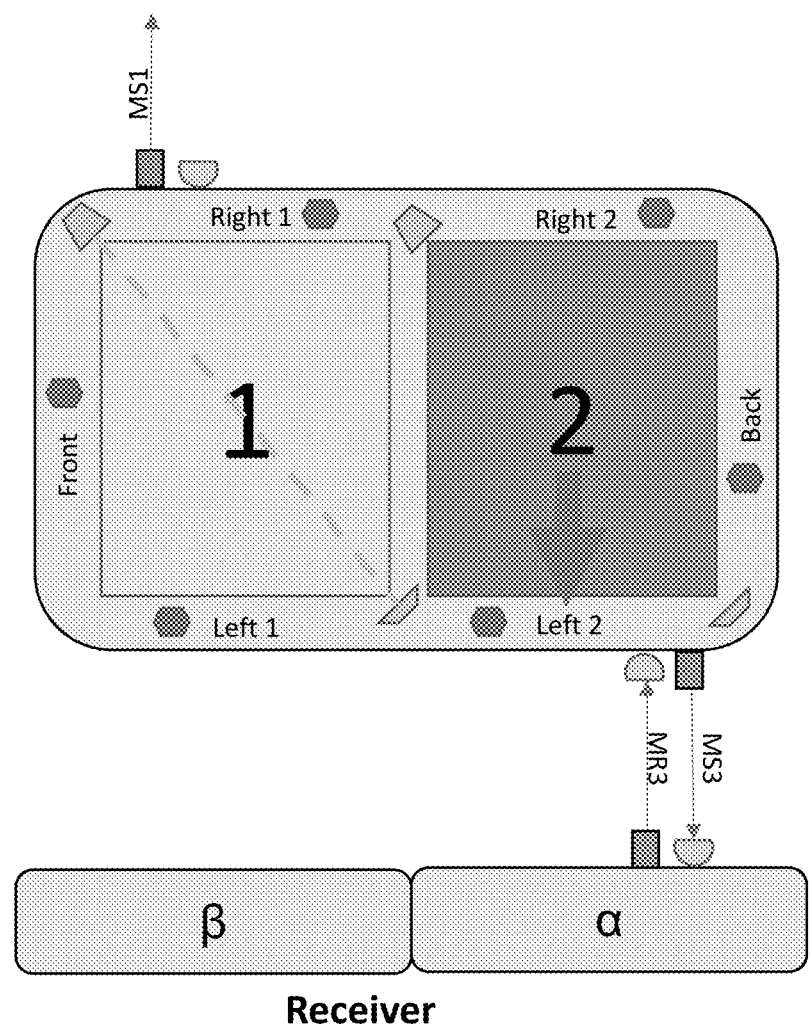

FIGS. 5D-5F depict the interactions of the mobile robot with the secondary stack handler station 16.

In FIG. 5D, from the mobile robot perspective, if position 1 is occupied, and position 2 is occupied, then turn left, and right (MS1 & MS3) signals ON for 300 ms then OFF for 900 ms every 1200 ms.

If RTR signals are received on the left side (MR3 on for 200, 700, or 800 ms), then turn on motors to move stack out on left position 2. If (MR3 on for 100, 700, or 900 ms), then turn on the motor to move stack out on left position 1.

From the receiver perspective, if positions α and β are empty, then Turn on signal MR1 On 700 ms then Off 500 ms. If only position β is available, then Turn on 'RTR' 900 ms. If pos β RTR and Pos α RTS, then turn on MS1 100

When the RTS signal is received (MS1 On 100, 300, or 500), then turn on the motor to receive a container at position α. When the RTS signal is received (MS1 On 200, 300, or 600), then turn on the motor to receive the container on position β.

In FIG. 5E, for the mobile robot, as position 1 is occupied, and position 2 is empty, then turn left, and right (MS1 & MS3) signals on for 100 ms then off for 1100 ms every 1200 ms. If the RTR signal is received on the left side (MR3 on for 100, 700 or 900 ms), then turn on motors to move the stack out on the left side.

For the receiver, if positions α and β are empty, then turn signal MR3 On for 700 ms then Off 500 ms. If only position β is available, then turn on 'RTR' 900 ms. If position β is ready to receive and position 2 on the robot is ready to send, then turn on MS3 100. When MS3 RTS signal is received (MS1 On 200, 300, or 600) then turn on motor to receive container on position β.

In FIG. 5F, mobile robot position 2 is occupied, position 1 is empty, then turn left and right (MS1 & MS3) signals ON for 200 ms then OFF for 1000 ms every 1200 ms.

If the RTR signal is received on the right side (MR3 on for 200, 700 or 800 ms), then turn on motors to move stack out on the left side.

On the receiver, if stack handler position α & β are empty, then turn on signal MR1 On 700 ms then Off 500 ms, If only, position α is available, then turn on 'RTR' 800 ms. If pos α RTR and Pos β RTS, then turn on MS1 200

When the RTS signal is received (MS1 On 100, 300, or 500) then turn on the motor to receive the container on position α.

Figure 6A:
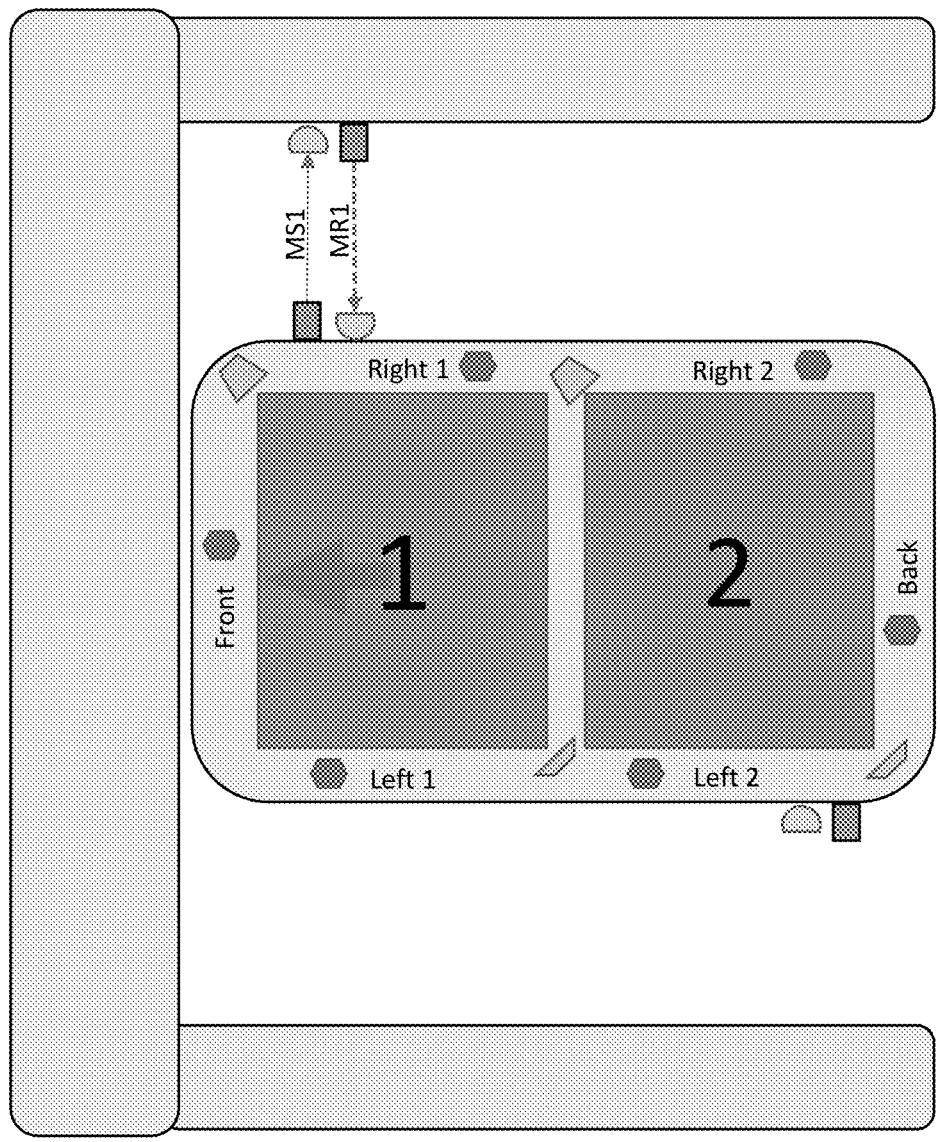
FIGS. 6A and 6B depict exemplary interactions of components of one embodiment of the system.
Figure 6B:
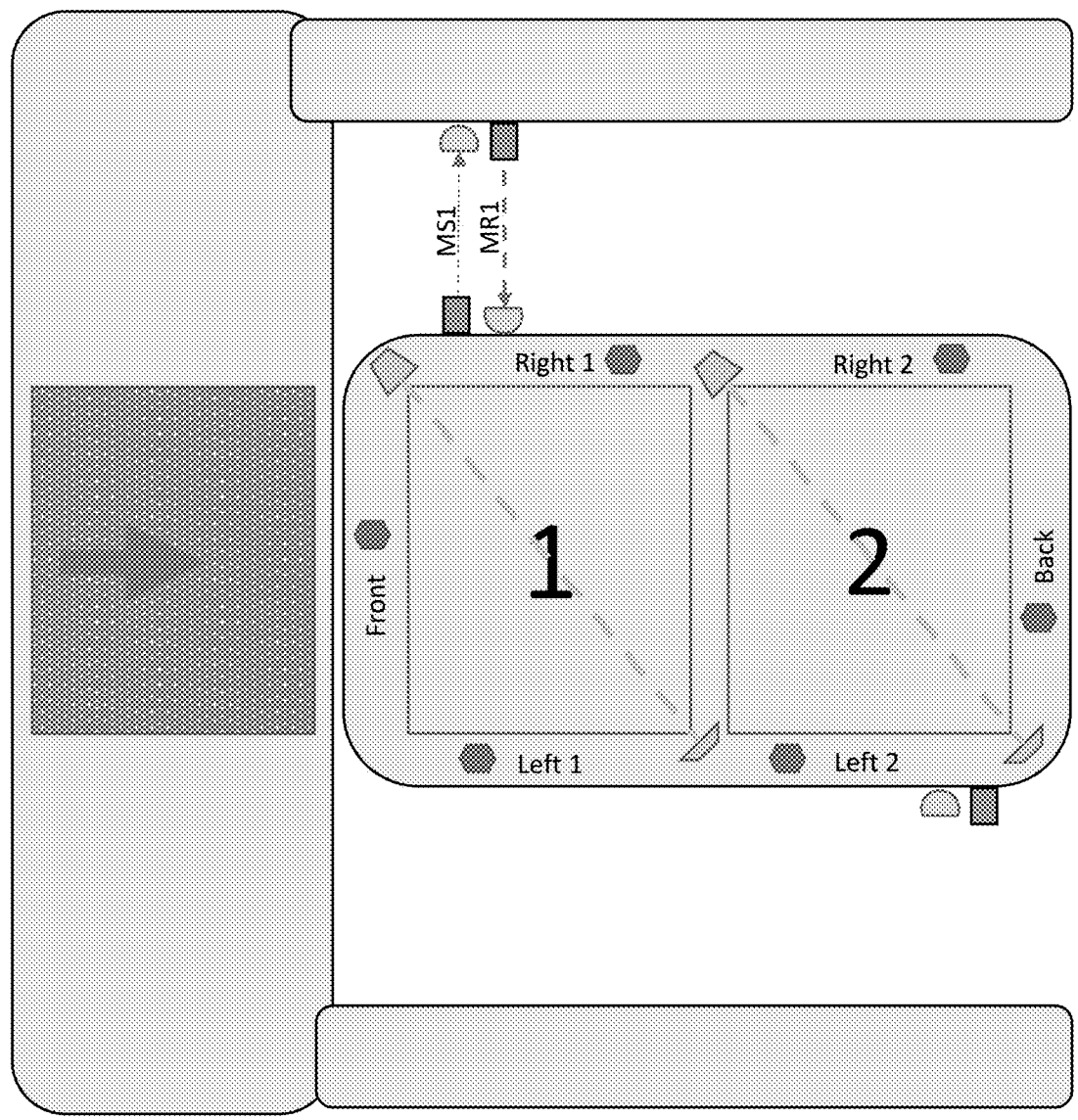

FIGS. 6A and 6B depict the interactions of the mobile robot with the front location of the receiver.

FIG. 6A shows an exemplary transfer of a stack from a mobile robot's front location to a front location on the receiver. On the mobile robot, if position 1 is occupied, position 2 is occupied, then turn left and right (MS1 & MS3) signals ON for 300 ms then OFF for 900 ms every 1200 ms.

If the RTR signal is received on the right side (MR1 on for 1000 ms), then turn on motors to move stack out on front position 1, and index the container from position 2 to 1.

On the receiver, if the central receiving position is empty, then turn on signal MR1 On 1000 ms then Off 100 ms.

When ready to send signal is received (MS1 On 100, 300, or 500), then turn on motor to receive container from the mobile robot.

FIG. 6B depicts the transfer from the central location on the receiver to the mobile robot in the front of the mobile robot.

On the mobile robot, if positions 1 & 2 are empty, then Turn on signal MR1 On 700 ms, then Off 500 ms, If only position 1 is available, then Turn on 'RTR' for 800 ms.

When the RTS signal is received (MS1 on 400) then turn on the motor to receive the container on position 1 from the front.

If All Transfers Complete signal is received, then start the mobile Undocking sequence. The all Transfers Complete signal comprises 1100 ms of the signal being on, followed by 100 ms of being off.

On the receiver, if ready to send, then Turn on signal MR1 On 400 ms, then Off 700 ms. When the RTS signal is received (MS1 On 700 or 800), then turn on the motor to send a container to the mobile robot. If all stack transfers from receiver to mobile boto have been completed, then Turn on All transfers Complete signal 1100.

Figure 7A:
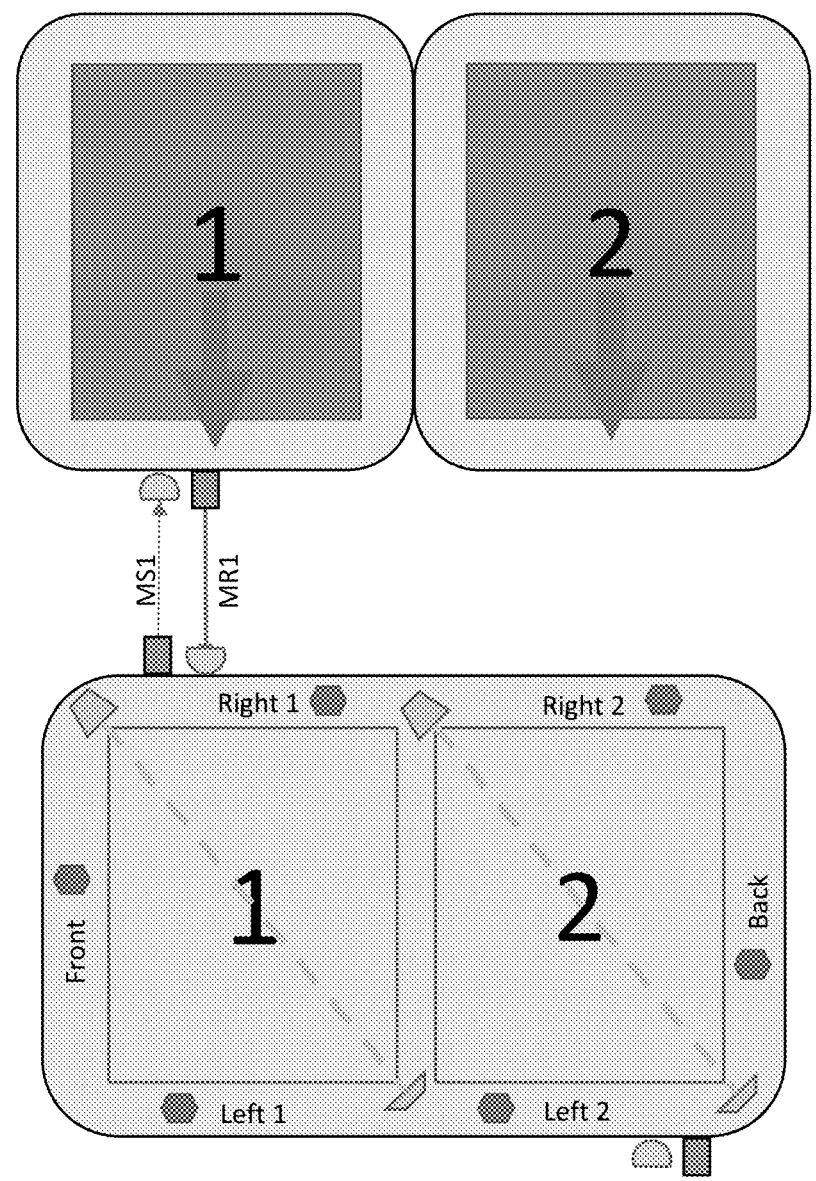
FIGS. 7A and 7B depict additional exemplary interactions of components of one embodiment of the system.
Figure 7B:
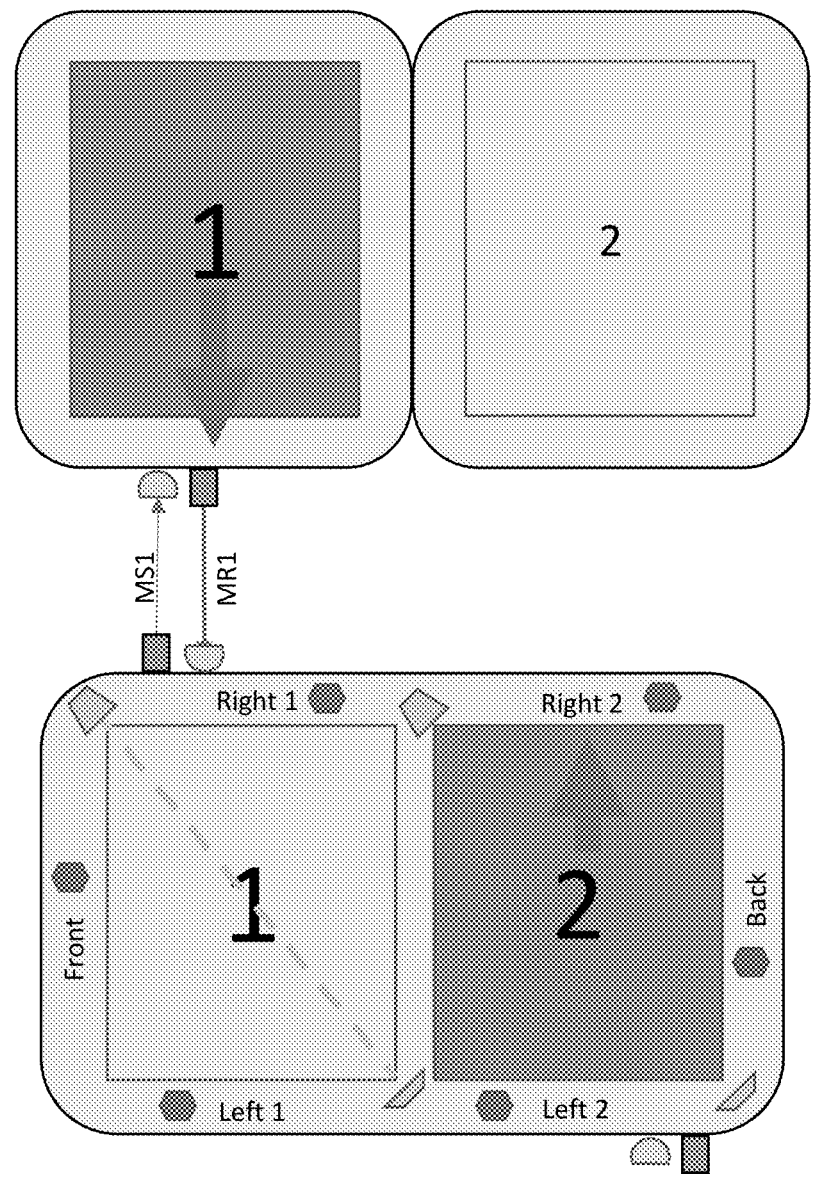

FIGS. 7A and 7B depict transfers between a mobile robot and a stationary workstation, such as a stack handler. In some embodiments, the actions shown in FIGS. 7A and 7B can be followed by two mobile robots exchanging payloads.

In FIG. 7A, if position 1 is occupied, position 2 is occupied, then turn (MR1 signal ON for 300 ms then OFF for 900 ms every 1200 ms.

If the RTR signal is received (MS1 on for 200, 700, or 800 ms), then turn on motors to move stack out on right position 1. If a signal on MS1 is detected (MS1 on for 100, 700, or 900 ms), then turn on the motor to move stack out on right position 2.

When both positions are empty, turn on All Transfers Complete MR1 On 1100.

On the mobile robot side, if positions 1 and 2 are empty, then Turn on signal MR1 On 700 ms, then Off 500 ms. If only position 2 is available, then Turn on 'RTR' 900 ms. If pos 2 RTR and Pos 1 RTS, then turn on MS1 100

When the RTS signal is received (MS1 On 100, 300, or 500), then turn on the motor to receive the container on position 1. When the RTS signal is received (MS1 On 200, 300, or 600), then turn on the motor to receive the container on position 2. When MR1 is on for 1100 (All Transfers Complete), start the undocking sequence and turn MS1 to 0.

FIG. 7B depicts the transfer of a stack from a stack handler to a mobile robot and the same time as transferring from the mobile robot to the stack handler.

On the stack handler, if position 1 is occupied, position 2 is occupied, then turn MR1 signal ON for 100 ms then OFF for 1100 ms every 1200 ms.

If RTR signal is received (MS1 on for 200, 700 or 800 ms), then turn on motors to move stack out on right pos 1, If (MS1 is on for 200, 300, or 600) then turn on the motor to receiver stack in pos 2. When both positions are full, turn on MR1 to 0.

If MS1 indicates RTR, but Stack Handler has nothing to send, then turn on All Transfers Complete MR1 (1100).

On the mobile robot side, if position 1 is empty and 2 is occupied, then Turn on signal MS1 On 200 ms, then Off 1000 ms. When RTS signal is received (MR1 On 100, 300, or 500) then turn on the motor to receive the container on position 1. When the RTR signal is received (MS1 On 100, 700 or 900 then turn on the motor to send the container on position 2, when MR1 on for 1100 (All Transfers Complete) start the undocking sequence and turn MS1 to 0.

Figure 8A:
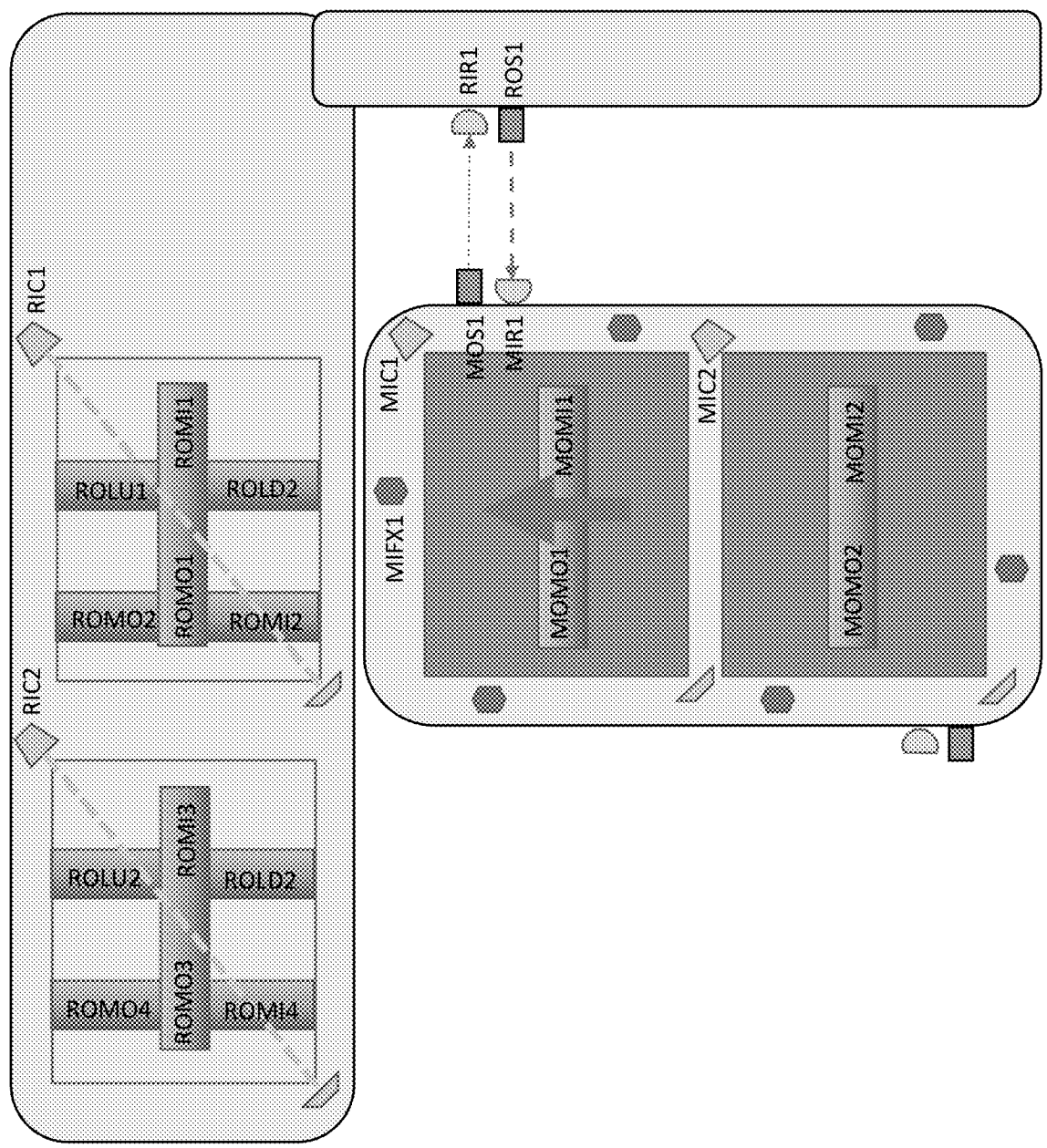

FIGS. 8A-8E show a payload transfer scenario. FIG. 8A depicts a schematic overview of a transfer of payloads from a mobile robot to a stationary work area. FIG. 8B depicts a table showing the signals exchanged as the first stage of the transfers occur. The elements responding to the signals in FIG. 8B are shown in FIG. 8A as the following.

MIFX1—Mobile Robot Input Front Transfer 1; MIC1—Mobile Robot Input Container Position 1 (1—full, 0—empty); MIC2—Mobile Robot Input Container Position 2; Mobile Robot1—Mobile Robot Input Pulse Width Optical M2M Signal Right Side Position 1; MOS1—Mobile Robot Output Pulse Width Optical M2M signal Right Side Position 1; MOMO1—Mobile Robot Output Roller Motor Out 1; MOMI1—Mobile Robot Output Roller Motor In 1; MOM02—Mobile Robot Output Roller Motor Out 2; MOMI1—Mobile Robot Output Roller Motor In 1; RIC1—Work Area Input Container Position 1; RIC2—Work Area Input Container Position 2; RIR1—Work Area Input Pulse Width Optical M2M Signal; ROR1—Work Area Output Pulse Width Optical M2M Signal; ROMO1—Work Area Output Roller Motor Out 1; ROMI1—Work Area Output Roller Motor In 1; ROMO2—Work Area Output Roller Motor Out 2; ROMI2—Work Area Output Roller Motor In 2; ROLU1—Work Area Output Lift Motor Up 1; ROLD1—

Work Area Output Lift Motor Down 1; ROM03—Work Area Output Roller Motor Out 3; ROMI3—Work Area Output Roller Motor In 3; ROMO4—Work Area Output Roller Motor Out 4; ROMI4—Work Area Output Roller Motor In 4; ROLU2—Work Area Output Lift Motor Up 2; ROLD2—Work Area Output Lift Motor Down 2.

Figure 8C:
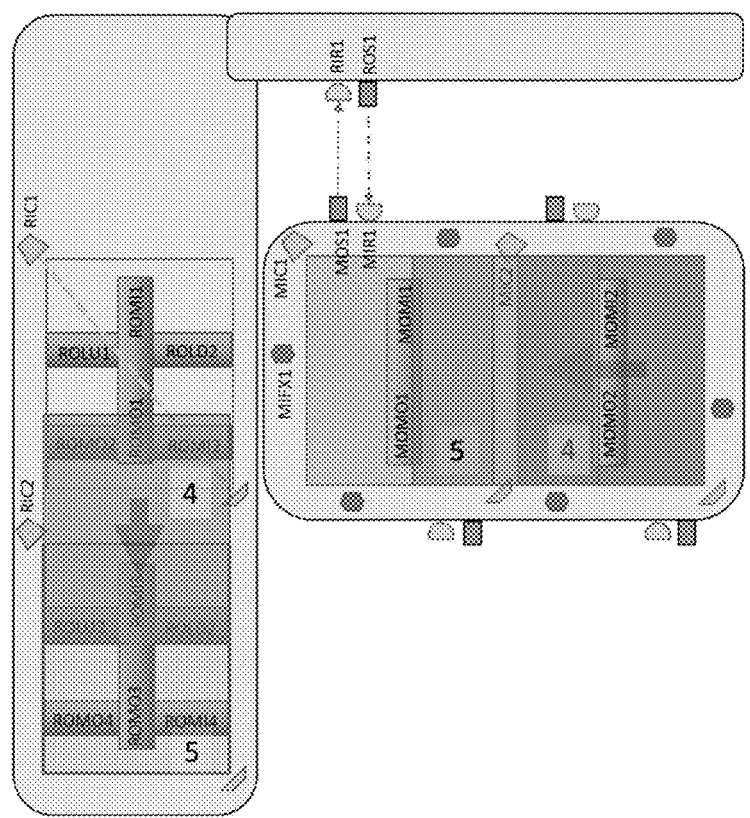

FIG. 8C depicts a transfer from a mobile robot to a work area and then internally the transfer within the work area.

Figure 8D:
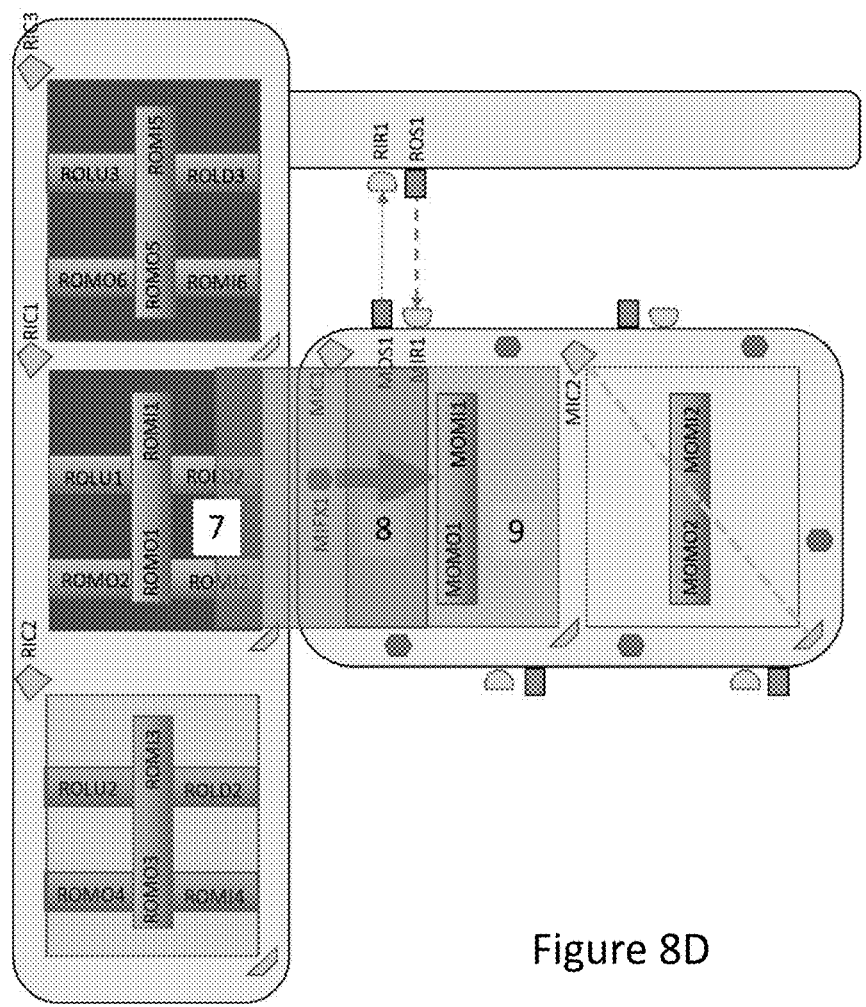

FIG. 8D depicts the transfer from the work area back to the mobile robot.

Figure 8E:
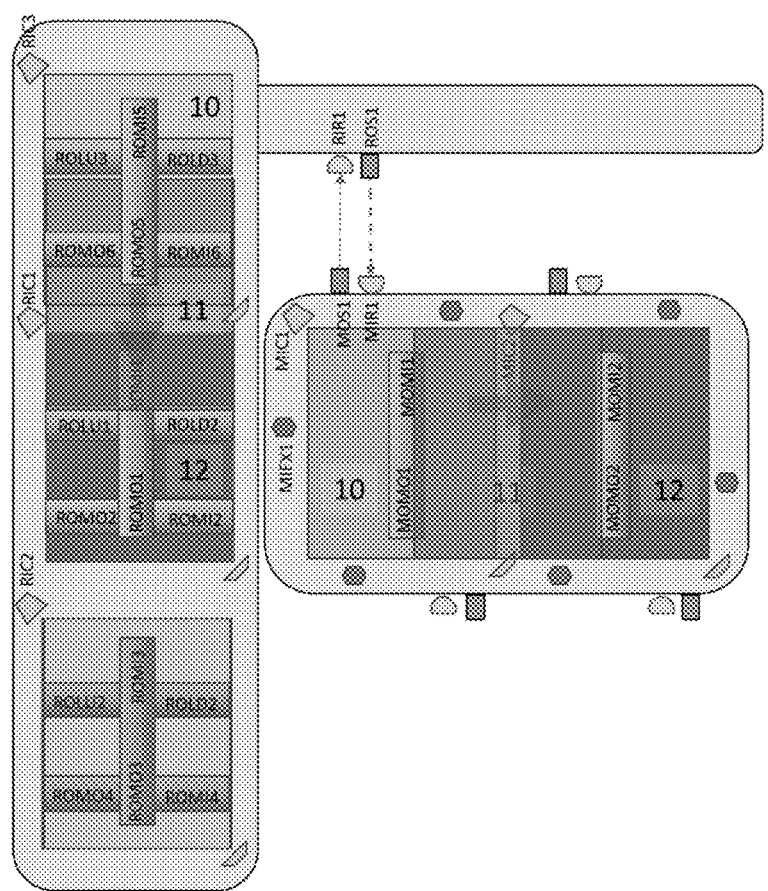

FIG. 8E depicts the internal shift from a work area to a mobile robot and then within a mobile robot.

Figure 9A:
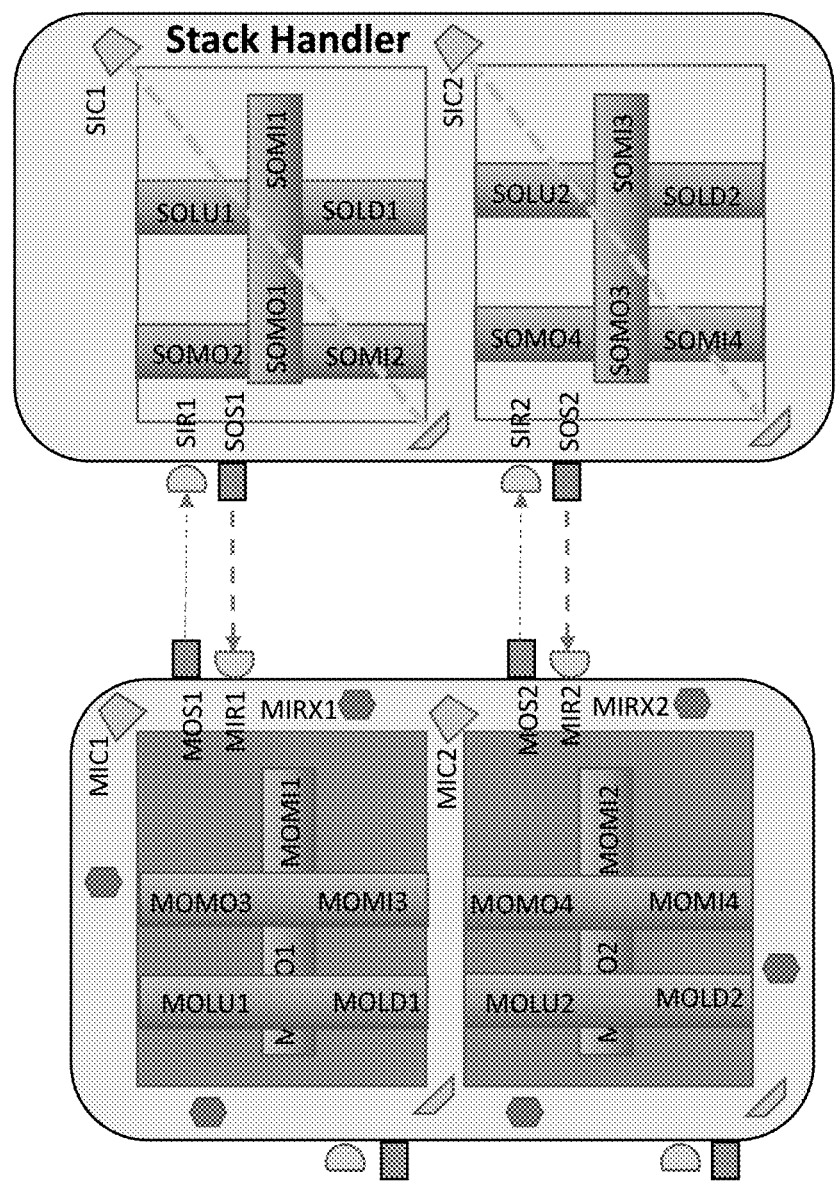
FIGS. 9A-9C depict additional example payload exchanges.
Figure 9B:
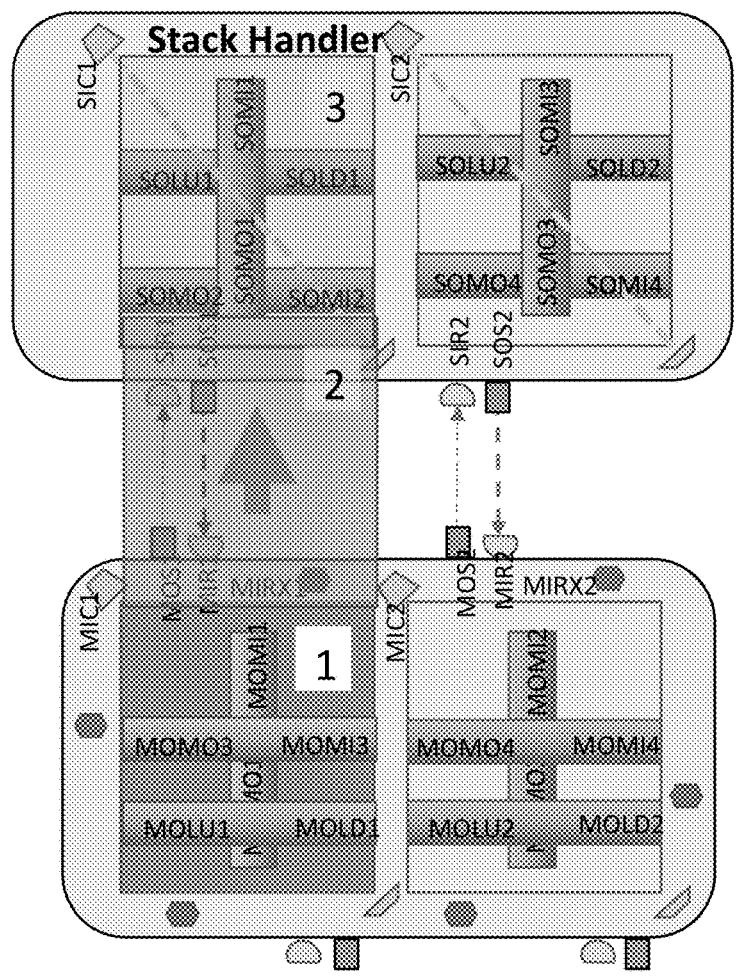
Figure 9C:
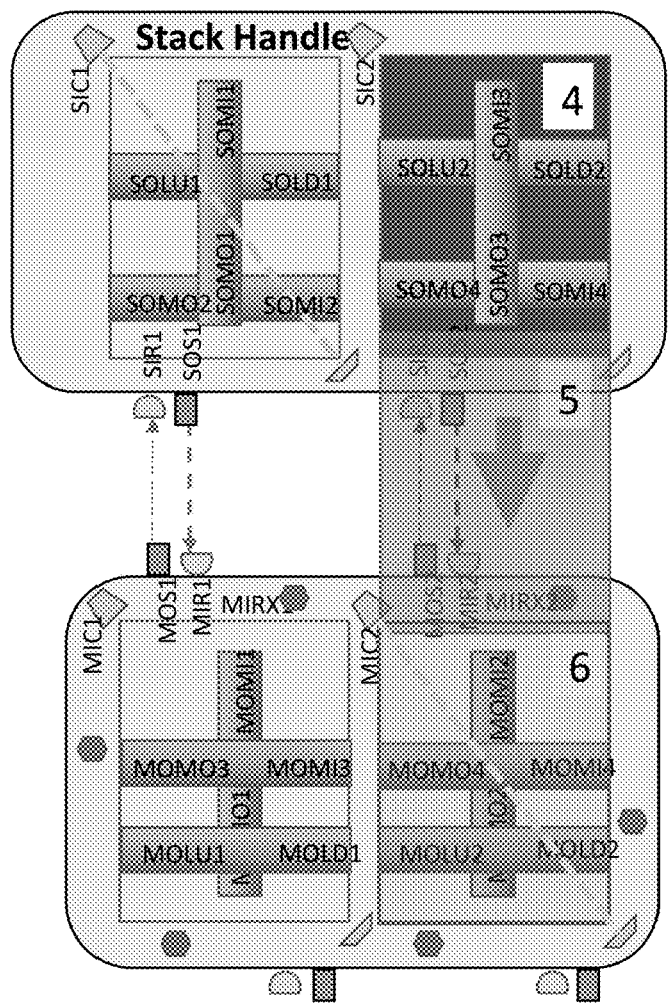

FIGS. 9A-C depict several sample interactions between the mobile robot and the stack handler.

FIGS. 10A-D depict a timing diagram of the interface between a mobile robot and a work area.

Figure 10A:
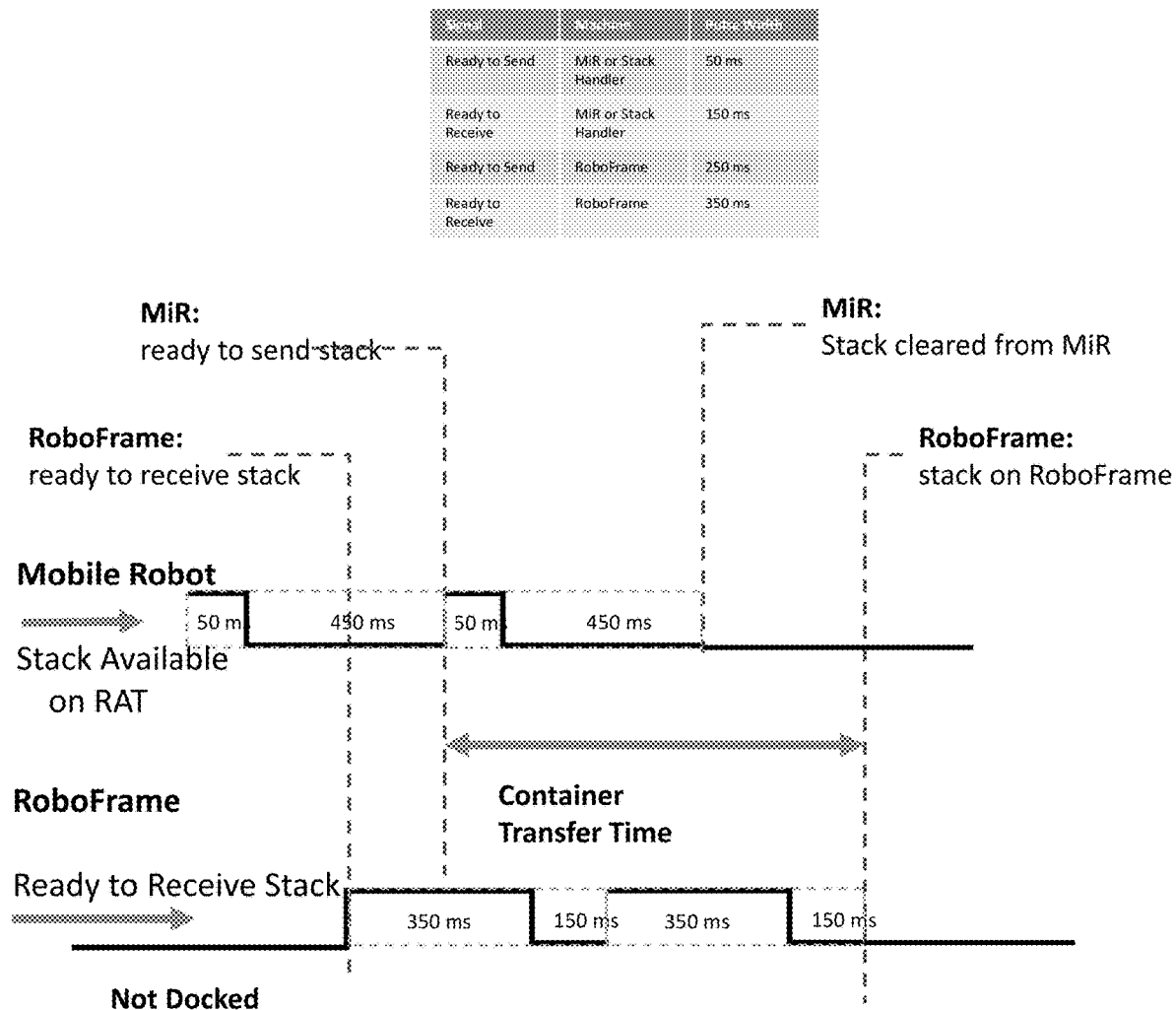
FIGS. 10A-D depict timing diagrams of signals exchanged in one embodiment of the system.
Figure 10B:
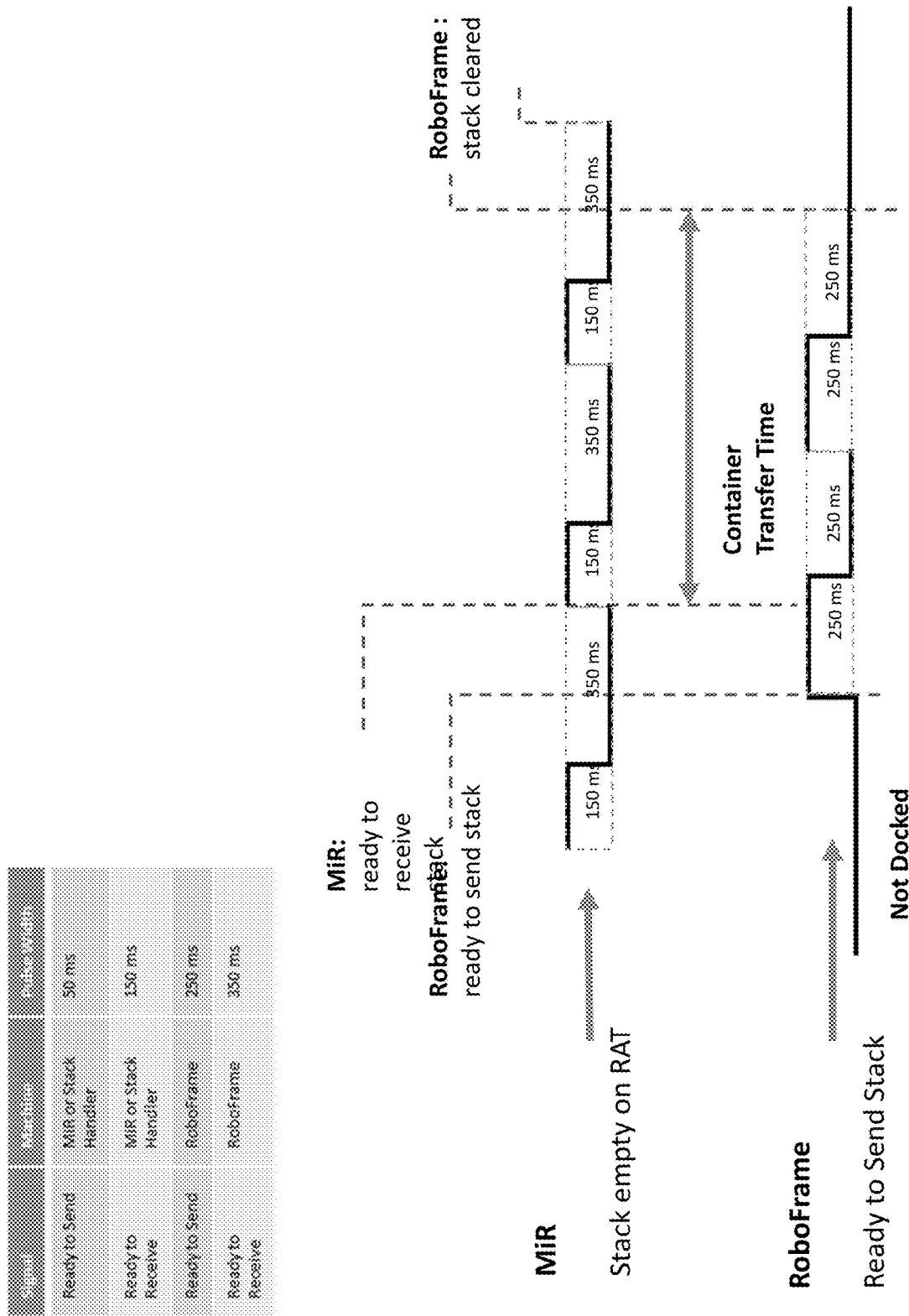
Figure 10C:
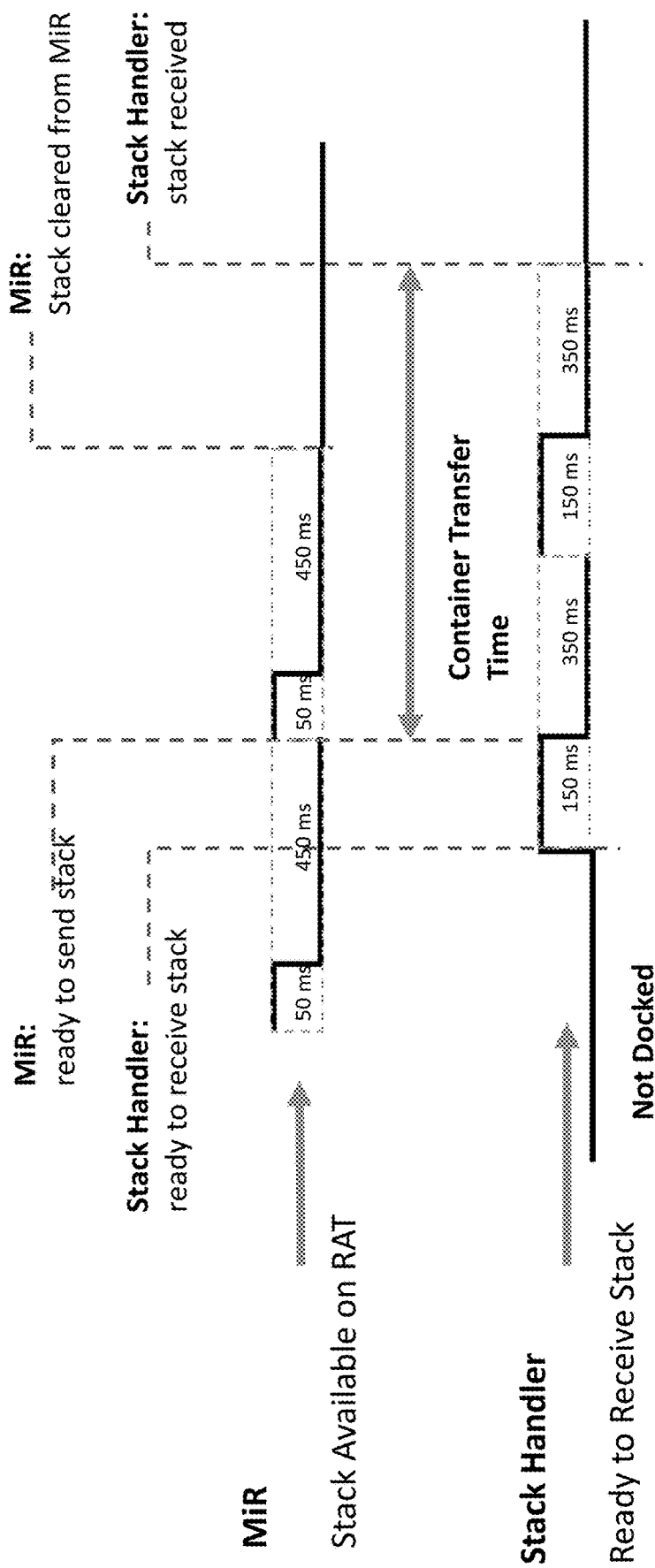
Figure 10D:
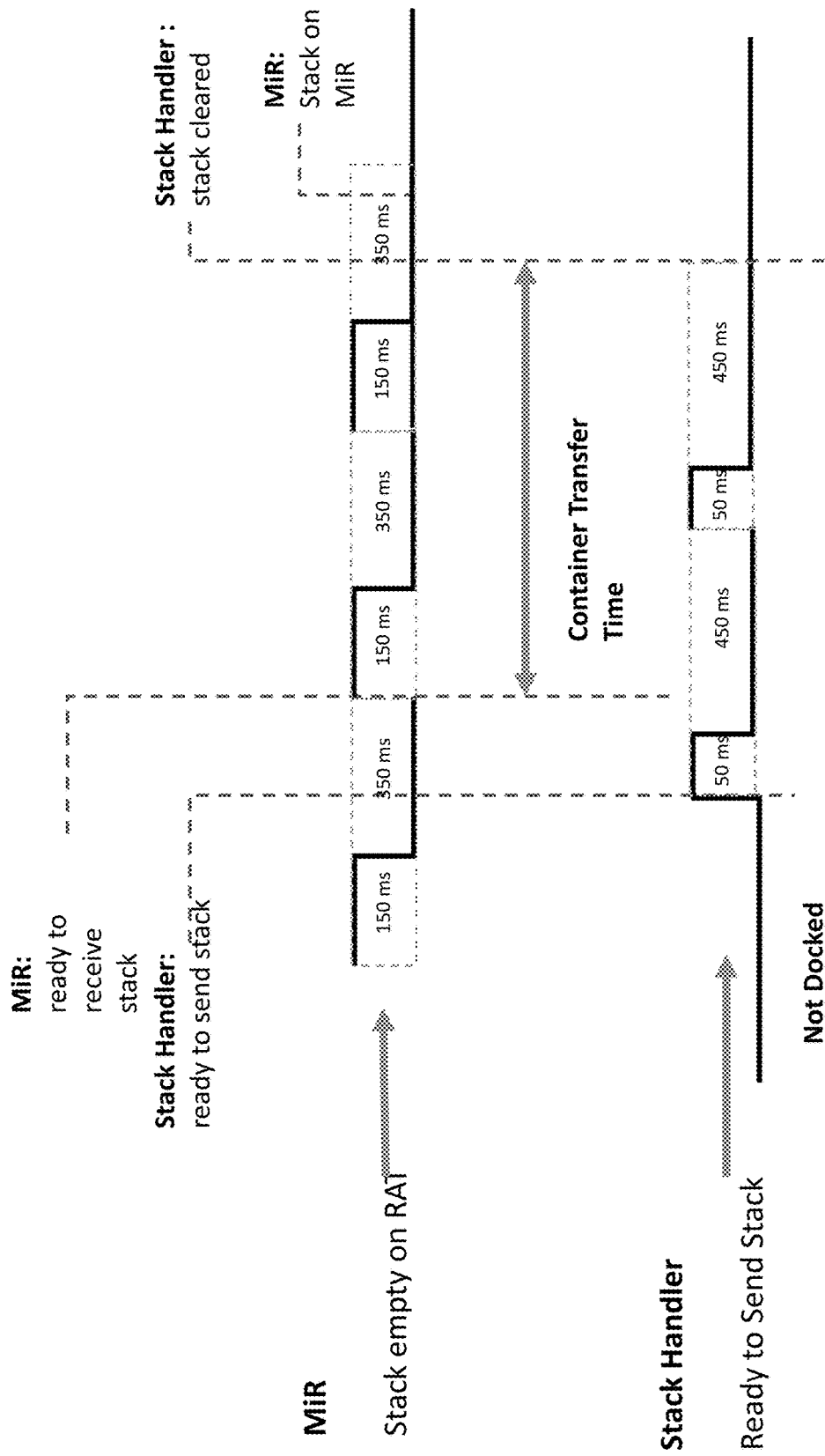
Figure 10E:
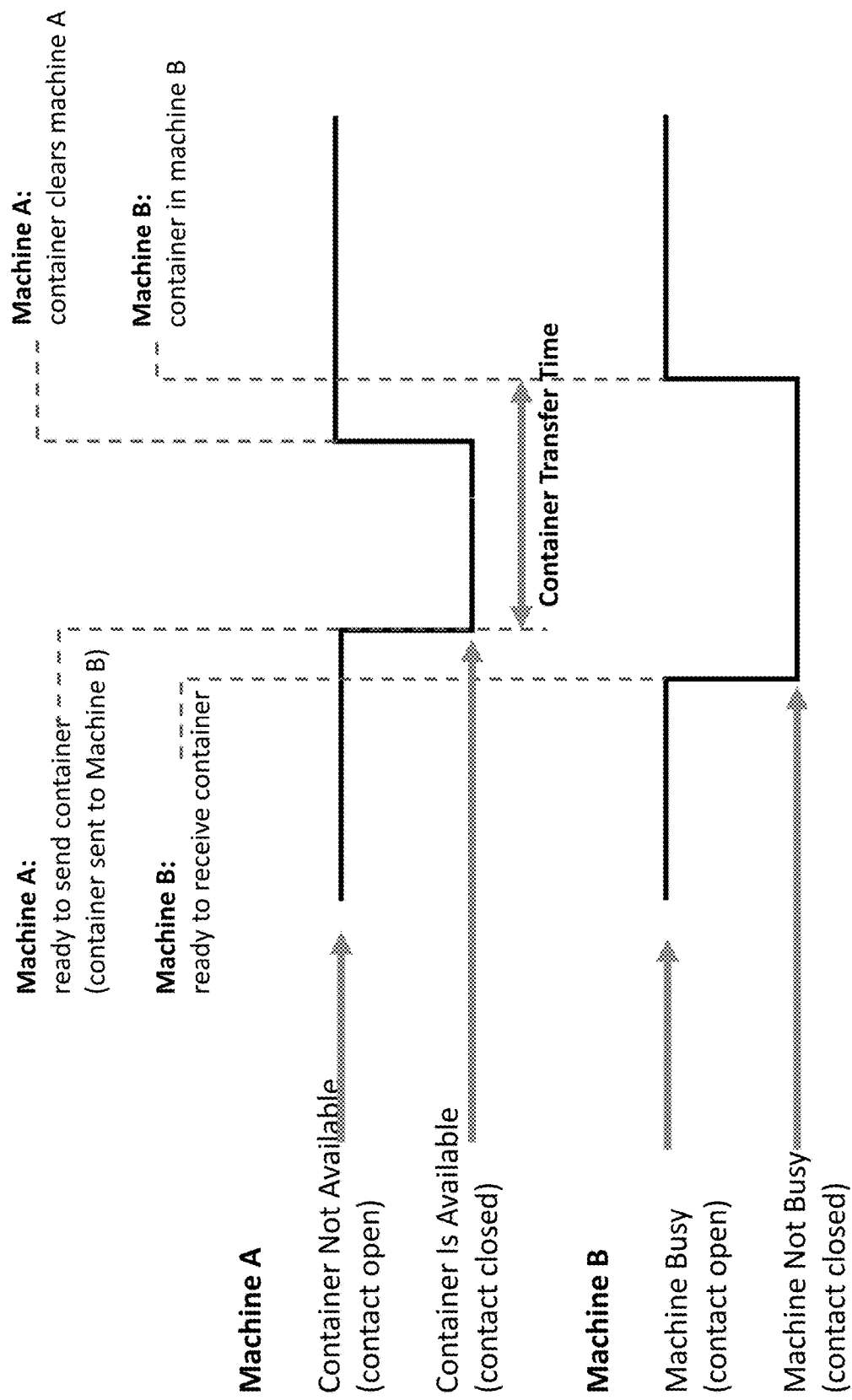
FIG. 10E depicts a timing diagram for transfers of a payload between machines.

FIG. 10E depicts a timing diagram for a container transfer interface between two machines (machine A and machine B).

Figure 11A:
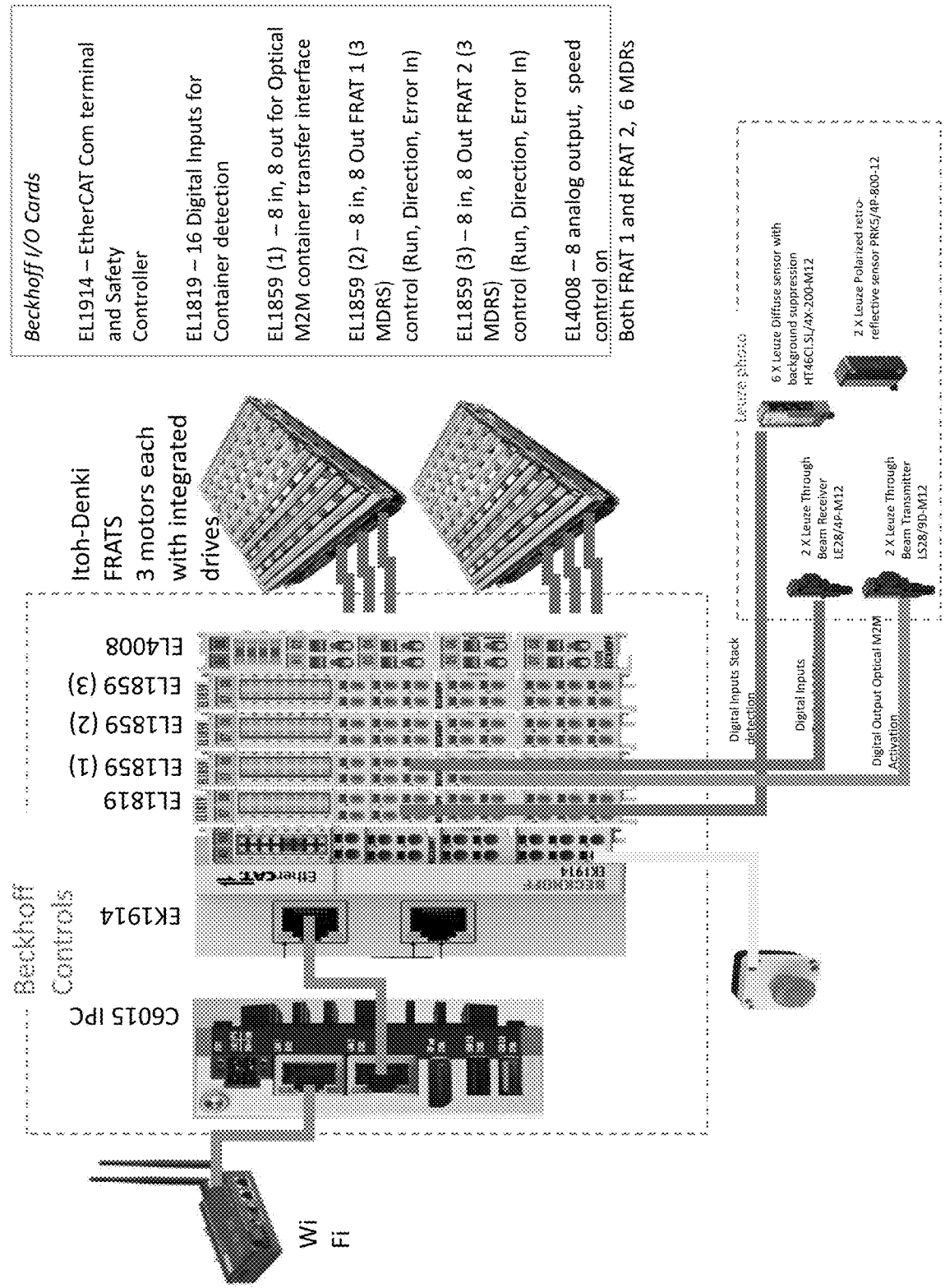
FIGS. 11A-C depict a schematic overview of several implementations of embodiments of the system.
Figure 11B:
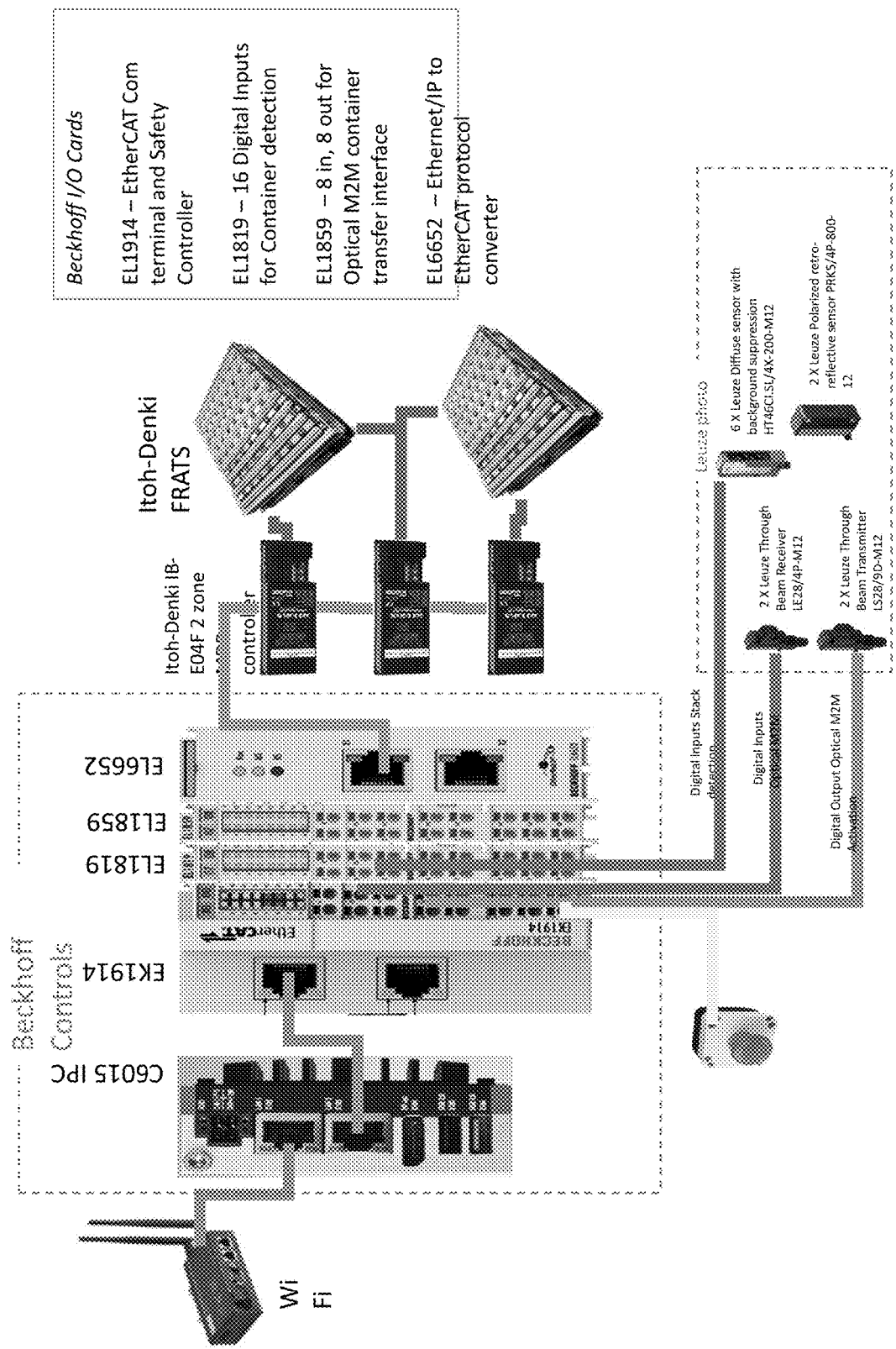
Figure 11C:
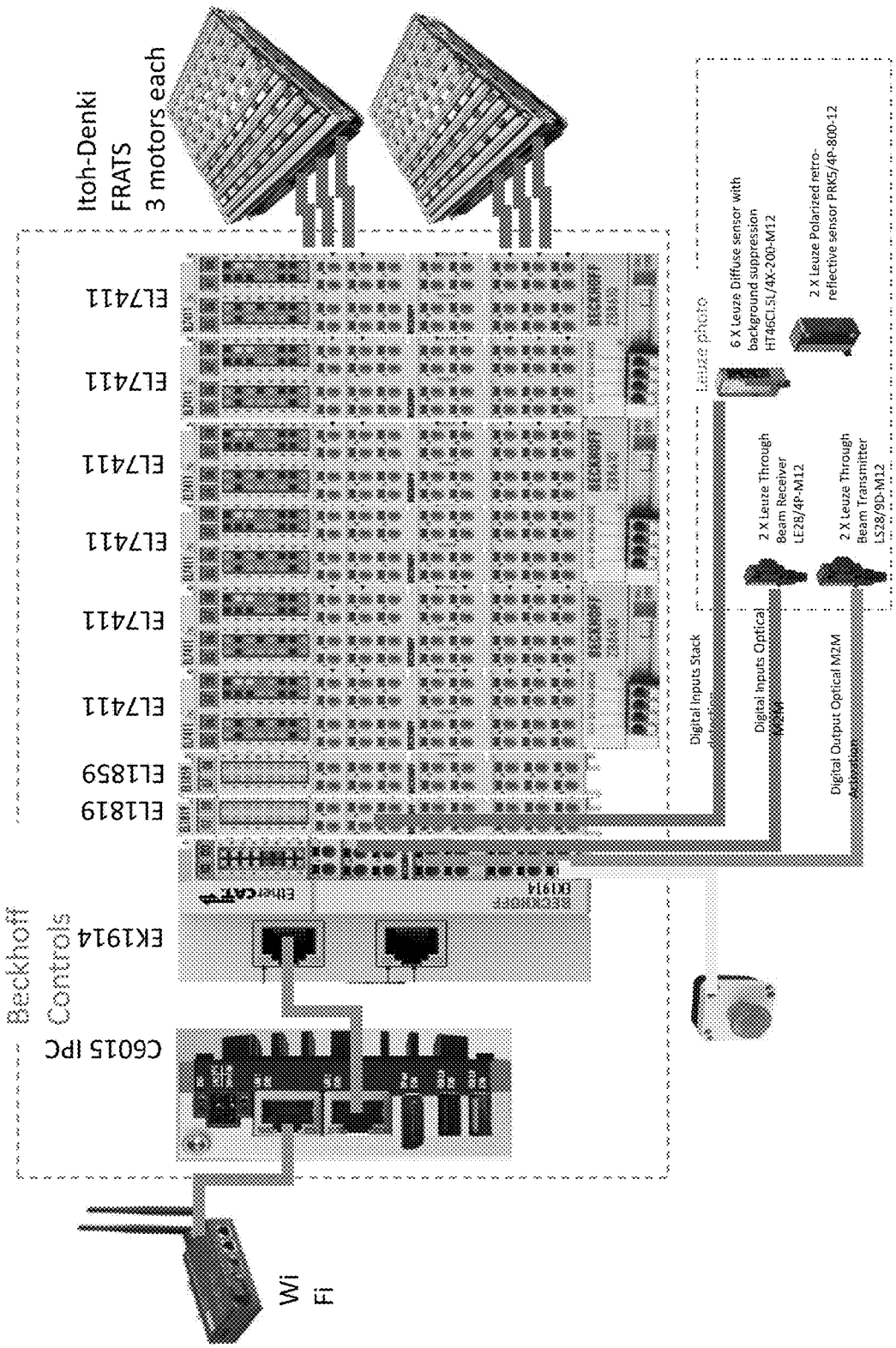

FIGS. 11A-C depict a schematic overview of the control system for a mobile robot and the optical machine to machine communications module, pursuant to several alternative embodiments.

Although exemplary implementations of the invention have been depicted and described in detail herein, it will be apparent to those skilled in the relevant art that various modifications, additions, substitutions, and the like can be made without departing from the spirit of the invention and these are therefore considered to be within the scope of the invention as defined in the following claims.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. While the dimensions and types of materials described herein are intended to define the parameters of the invention, they are by no means limiting, but are instead exemplary embodiments. Many other embodiments will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the terms "comprising" and "wherein." Moreover, in the following claims, the terms "first," "second," and "third," are used merely as labels, and are not intended to impose numerical requirements on their objects. Further, the limitations of the following claims are not written in means-plus-function format and are not intended to be interpreted based on 35 U.S.C. § 112, sixth paragraph, unless and until such claim limitations expressly use the phrase "means for" followed by a statement of function void of further structure.

The embodiment of the invention in which an exclusive property or privilege is claimed is defined as follows:

1. A system of communications between machines comprising:
   a communication module having at least an infrared transmitter and receiver;
   a mobile robot having at least one said communication module; and
   a receiving station communication module having at least an opposing infrared transmitter and receiver;
   wherein each mobile robot identifies itself and communicates its intended tasks to a receiving station by sending a single pulse width encoded message wherein the encoding of information within the message occurs by timing of a message.

2. The system of claim 1 further comprising controlled actuators, wherein said actuators are enabled or disabled based on received signals.

3. The system of claim 1 wherein said communications include identifier information.

4. The system of claim 1 wherein said communications includes a ready to send signal.

5. The system of claim 1 wherein said communications includes a ready to receive signal.

6. The system of claim 1 wherein each message is sent within a 1200 ms interval.

7. The system of claim 1 wherein each communication module includes an independent power supply.

8. The system of claim 1 wherein said receiving station engages with a mobile robot to exchange messages from multiple communications modules and aligns the mobile robot to one receiving area.

9. The system of claim 1 further comprising a logging function.

10. The system of claim 1 wherein exchanged messages are not encoded into packets of data.

11. A method of communications between machines comprising:
   equipping each machine with a communication module having at least a power supply, an infrared transmitter, an infrared receiver, and a timing mechanism;
   wherein at least one of the machines is a mobile robot having at least one said communication module and wherein another of said machines is a receiving station communication module having at least an opposing infrared transmitter and receiver;
   communicating a status message from the mobile robot to the receiving station using the corresponding communication modules, wherein said communicating occurs by encoding messages using timing of sending of various messages.

12. The method of claim 11 further comprises controlling actuators, wherein said actuators are enabled or disabled based on received signals.

13. The method of claim 11 wherein said communications include identifier information.

14. The method of claim 11 wherein said communications includes a ready to send signal.

15. The method of claim 11 wherein said communications includes a ready to receive signal.

16. The method of claim 11 wherein each message is sent within a 1200 ms interval.

17. The method of claim 11 wherein each communication module includes an independent power supply.

18. The method of claim 11 wherein said receiving station engages with a mobile robot to exchange messages from multiple communications modules and aligns the mobile robot to one receiving area.

19. The method of claim 11 wherein further comprising logging transfers between the mobile robot and the receiving station.

20. The method of claim 11 wherein exchanged messages are not encoded into packets of data.

* * * * *